(12) United States Patent
Ruetenik

(10) Patent No.: US 10,548,304 B2
(45) Date of Patent: *Feb. 4, 2020

(54) EQUINE SHOE

(71) Applicant: Monty L. Ruetenik, Clear Lake Shores, TX (US)

(72) Inventor: Monty L. Ruetenik, Clear Lake Shores, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,015

(22) Filed: Feb. 2, 2019

(65) Prior Publication Data

US 2019/0166818 A1    Jun. 6, 2019

Related U.S. Application Data

(63) Continuation-in-part of application No. 15/697,362, filed on Sep. 6, 2017, which is a continuation-in-part of application No. 15/274,350, filed on Sep. 23, 2016, which is a continuation-in-part of application No. 15/138,002, filed on Apr. 25, 2016, now Pat. No. 9,770,018, which is a continuation-in-part of application No. 15/051,343, filed on Feb. 23, 2016, now Pat. No. 10,206,386, and application No. 15/051,343, Feb. 23, 2016, now Pat. No. 10,206,386, which is a continuation-in-part of application No. 15/051,343, filed on Feb. 23, 2016, now Pat. No. 10,206,386, which is a continuation-in-part of (Continued)

(51) Int. Cl.
| | | |
|---|---|---|
| *A01L 3/02* | (2006.01) | |
| *A61D 9/00* | (2006.01) | |
| *A61F 5/058* | (2006.01) | |
| *A01L 7/02* | (2006.01) | |

(52) U.S. Cl.
CPC .. *A01L 3/02* (2013.01); *A01L 7/02* (2013.01)

(58) Field of Classification Search
CPC ......... A61F 5/0585; A61D 9/00; A61D 99/00; A01L 1/00; A01L 1/02; A01L 1/04; A01L 3/00; A01L 3/02; A01L 3/04; A01L 3/06; A01K 13/006; A01K 13/007

See application file for complete search history.

(56) References Cited

U.S. PATENT DOCUMENTS 10,206,386 B2 * 2/2019 Ruetenik .................. A61D 9/00
2017/0027150 A1 * 2/2017 Ruetenik .............. A01K 13/007

FOREIGN PATENT DOCUMENTS

FR        2982734 A1      5/2013

OTHER PUBLICATIONS

Agne, R., "Equine MDT Dressings," *Monarch Labs*, 2006. [Online]. Available: https://www.monarchlabs.com/equinedressings.htm. [Accessed: Jan. 30, 2019].

(Continued)

*Primary Examiner* — Tarla R Patel
(74) *Attorney, Agent, or Firm* — Douglas Baldwin

(57) ABSTRACT

A solid structure, multi-stratum, hoof shaped structure to cover substantially the entire underside of a hoof. The shoe has a convex bottom to allow center loading of the hoof during a broader range of movement than with typical equine shoes. Various configurations provide filler material between the shoe and the hoof, which may be applied before the shoe is attached, or the shoe may have at least one relatively small port to allow insertion of filler material after the shoe is attached.

21 Claims, 12 Drawing Sheets

Related U.S. Application Data application No. 14/046,751, filed on Oct. 4, 2013, now abandoned, which is a continuation-in-part of application No. 14/046,751, filed on Oct. 4, 2013, now abandoned, which is a continuation-in-part of application No. 14/046,751, filed on Oct. 4, 2013, now abandoned.

(60) Provisional application No. 62/777,154, filed on Dec. 8, 2018, provisional application No. 62/264,935, filed on Dec. 9, 2015, provisional application No. 62/264,935, filed on Dec. 9, 2015, provisional application No. 62/264,935, filed on Dec. 9, 2015, provisional application No. 61/881,556, filed on Sep. 24, 2013, provisional application No. 61/881,556, filed on Sep. 24, 2013, provisional application No. 61/881,556, filed on Sep. 24, 2013.

(56) References Cited

OTHER PUBLICATIONS

All Natural Horse Care, "Ultra Jogging Shoes," *Equine Jogging Shoes*, Dec. 2013. [Online]. Available: http://equine-jogging-shoes.com/ultra-jogging-shoe/. [Accessed: Jan. 17, 2019].

Castelijns, H., "Full rolling motion shoes in equine podiatry," Mascalcia.net, 2003. [Online]. Available: http://www.mascalcia.net/articoli/a2003_56.htm. [Accessed: Jan. 17, 2019].

Castelijns, H., "Hoof care for laminitis and founder," Mascalcia.net, Mar. 2003. [Online]. Available: http://www.mascalcia.net/articoli/a2003_55.htm. [Accessed: Jan. 17, 2019].

Castelijns, H., "Orthopedic shoeing techniques in the prevention and treatment of tendon and articular pathologies," Mascalcia.net, Dec. 1999. [Online]. Available: http://www.mascalcia.net/articoli/a1999_15.htm. [Accessed: Jan. 17, 2019].

Castelijns, H., "Shock absorbing shoeing techniques," Mascalcia.net, Oct. 28, 2000. [Online]. Available: http://www.mascalcia.net/articoli/a2000_27.htm. [Accessed: Jan. 17, 2019].

Castelijns, H., "Shoeing Laminitis Cases," Mascalcia.net, 2004. [Online]. Available: http://www.mascalcia.net/articoli/a2004_73.htm. [Accessed: Jan. 17, 2019].

Castle Plastics, "Sno Pads," *Castle Plastics*, 2015. [Online]. Available: http://www.castleplastics.com/sno.php. [Accessed: Jan. 17, 2019].

equicast.com, "Dr Mike Steward's Wooden Shoes," *Equicast*, Mar. 2018. [Online]. Available: https://equicast.com/therapeutic-shoes/dr-mike-stewards-wooden-shoes/. [Accessed: Jan. 17, 2019].

equicast.com, "Equicast Therapeutic Shoes—support—equicast.com," *Equicast*, Dec. 2016. [Online]. Available: https://equicast.com/therapeutic-shoes/equicastit/. [Accessed: Jan. 17, 2019].

equicast.com, "FAQ" *Equicast*, Published on or before Jan. 17, 2019. [Online]. Available: https://equicast.com/eva-leather-shoes/. [Accessed: Jan. 17, 2019].

equicast.com, "Therapeutic Shoe Kit," *Equicast*, Aug. 2016. Available: https://equicast.com/therapeutic-shoe-kit/. [Accessed: Jan. 17, 2016].

Equine Fusion, "Active Jogging Shoe," *Equine Fusion*, 2019. [Online]. Available: http://eqfusion.com/product/activejoggingshoe/. [Accessed: Jan. 17, 2019].

Equine Fusion, "Equine Fusion," *Equine Fusion*, 2019. [Online]. Available: http://eqfusion.com/. [Accessed: Jan. 17, 2019].

Foot & Ankle Center of Washington, "Rocker Bottom Sole Shoes Reviewed—Walking, Dress, Running," *Foot & Ankle Center of Washington*, 2019. Available: https://www.footankle.com/shoe-therapy/rocker-bottom-sole-shoes/. [Accessed: Jan. 17, 2019].

Jurga, F., "Clog on Clog: Removable System for Laminitis," *The Hoof Blog*, Jul. 23, 2008. https://hoofcare.blogspot.com/2008/07/clog-on-clog-removable-system-for.html. [Accessed: Jan. 30, 2019].

Kentucky Equine Research Staff, "Explaining Laminitis Part Three: Diagnosis, Current Advice on Treating Laminitis and Prevention," *Cyberhorse Guide to Horse Health*, Published on or before Dec. 6, 2018. [Online]. Available: http://www.cyberhorse.net.au/cgi-bin/tve/displaynewsitem.pl?20040325laminitispt3.txt. [Accessed: Dec. 6, 2018].

Larson. E., "How Veterinarians Evaluate Horses With Laminitis," *The Horse*, Jan. 23, 2018. Available: https://thehorse.com/139403/how-veterinarians-evaluate-horses-with-laminitis/. [Accessed: Jan. 17, 2019].

Larson, E., "Managing Two Common Laminitis Complications," *The Horse*, Mar. 10, 2018. Available: https://thehorse.com/155606/managing-two-common-laminitis-complications/. [Accessed: Jan. 17, 2019].

Larson, E., "Preventing and Treating Sepsis-Related Laminitis," *The Horse*, Jan. 31, 2018. Available: https://thehorse.com/139442/preventing-and-treating-sepsis-related-laminitis/. [Accessed: Jan. 17, 2019].

Larson, E., "The Latest on Supporting-Limb Laminitis," *The Horse*, Mar. 14, 2018. Available: https://thehorse.com/155796/the-latest-on-supporting-limb-laminitis/. [Accessed: Jan. 17, 2019].

Oswald Farrier Services, "Case Studies," *Equicast*, Feb. 2017. [Online]. Available: http://equicast.com/casesstudies/. [Accessed: Jan. 17, 2019].

Redden, R., "When and How to Use the Full Rocker Motion Shoe," *NANRIC*, Jul. 2006. [Online]. Available: http://www.nanric.com/when_to_use_the_rocker_shoe.html. [Accessed: Jan. 17, 2019].

Schoolcraft, C., "Comfort Hoofs—Comfort Hoofs Our Jogging Shoe Styles—Equine Fusion World's First Jogging Shoes for Horses," *Comfort Hoofs*, Published on or before Jan. 17, 2019. [Online]. Available: http://www.comforthoofs.com/our-jogging-shoe-styles/. [Accessed: Jan 17, 2019].

Sound Horse Technologies, "Morrison Roller Motion," *Glue on Horseshoes by Sound Horse Technologies*, 2019. [Online]. Available: https://soundhorse.com/products/therapeutic/morrison-roller-motion/. [Accessed: Jan. 17, 2019].

Steward, M. L., "How to Construct and Apply Atraumatic Therapeutic Shoes to Treat Acute or Chronic Laminitis in the Horse," in *AAEP Proceedings*, New Orleans (LA), 2003, vol. 49, pp. 337-346. Available: https://www.ivis.org/proceedings/AAEP/2003/steward/IVIS.pdf. [Accessed: Jan. 30, 2019].

Van Heel, M.C.V., P. R. Van Weeren, and W. Back, "Shoeing sound Warmblood horses with a rolled toe optimises hoof-unrollment and lowers peak loading during breakover," *Equine Veterinary Journal*, vol. 38, No. 3, pp. 258-262, May 2006. Available: https://onlinelibrary.wiley.com/doi/abs/10.2746/042516406776866471. [Accessed: Dec. 5, 2018].

\* cited by examiner

EQUINE SHOE

CROSS-REFERENCE TO RELATED APPLICATION

This application makes the following priority claims, claiming the benefit of the following U.S. patent applications.
1) This application is a continuation-in-part (CIP) of U.S. patent application Ser. No. 15/051,343 ("Equine Shoe"), filed Feb. 23, 2016, which is currently pending.
   1) Ser. No. 15/051,343 claims the benefit of U.S. provisional patent application No. (US PRO) 62/264,935 ("Equine Shoe"), filed Dec. 9, 2015.
   2) Ser. No. 15/051,343 is a CIP of U.S. Ser. No. 14/046,751 ("Equine Leg Cast Rocker Attachment"), filed Oct. 4, 2013, which is currently abandoned.
      1) Ser. No. 14/046,751 claims the benefit of US PRO 61/881,556 ("Equine Leg Cast Rocker Attachment"), filed Sep. 24, 2013.
2) This application is also a CIP of U.S. Ser. No. 15/274,350 ("Medication Rocker Shoe and Method"), filed Sep. 23, 2016, which is currently pending.
   1) Ser. No. 15/274,350 is a CIP of U.S. Ser. No. 15/138,002 ("Rocker Shoe and Attachment for an Equine Boot Assembly"), filed on Apr. 25, 2016, which issued as U.S. Pat. No. 9,770,018 on Sep. 26, 2017.
      1) Ser. No. 15/138,002 is a CIP of U.S. Ser. No. 15/051,343 ("Equine Shoe"), filed Feb. 23, 2016, which is currently pending.
      2) Ser. No. 15/138,002 is a CIP of U.S. Ser. No. 14/046,751 ("Equine Leg Cast Rocker Attachment"), filed Oct. 4, 2013, which is currently abandoned.
      3) Ser. No. 15/138,002 claims the benefit of US PRO 62/264,935 ("Equine Shoe"), filed Dec. 9, 2015.
      4) Ser. No. 15/138,002 claims the benefit of US PRO 61/881,556 ("Equine Leg Cast Rocker Attachment"), filed Sep. 24, 2013.
   2) Ser. No. 15/274,350 is a CIP of U.S. Ser. No. 15/051,343 ("Equine Shoe"), filed Feb. 23, 2016, which is currently pending.
   3) Ser. No. 15/274,350 is a CIP of U.S. Ser. No. 14/046,751 ("Equine Leg Cast Rocker Attachment"), filed Oct. 4, 2013, which is currently abandoned.
      4) Ser. No. 15/274,350 claims the benefit of US PRO 61/881,556 ("Equine Leg Cast Rocker Attachment"), filed Sep. 24, 2013.
      5) Ser. No. 15/274,350 claims the benefit of US PRO 62/264,935 ("Equine Shoe"), filed Dec. 9, 2015.
3) This application also claims the benefit of US PRO No. 62/777,154 ("Equine Shoe"), filed Dec. 8, 2018.
4) This application is also a CIP of U.S. Ser. No. 15/697,362 ("Equine Rocker Shoe"), filed Sep. 6, 2017, which is currently pending.

FEDERALLY SPONSORED RESEARCH

Not Applicable

SEQUENCE LISTING

Not Applicable

BACKGROUND OF THE INVENTION

Field of the Invention

This invention relates to equine shoes. More specifically it relates to an equine shoe structure and assembly that provides a cushioning effect on the hoof and legs, covers substantially all the underside of a hoof, provides a "rocker" break-over effect and maintains reaction force on a hoof closer to the moment axis of the leg, provides for inserting a custom-molded orthotic pad without removing the shoe, and provides for distributing the force on the hoof across a broader portion of the hoof.

Description of the Related Art

Conventional equine shoes are bands of metal or hard polymer surrounding a large center opening. The bands are designed to attach under the walls of an equine hoof. Such shoes do not provide any cushioning of the hoof and leg. In some applications, where it is desirable to completely cover the underside of the hoof, fillers such as Equi-Pak™ are applied in the opening in the center of the shoe. Some solid shoes like "clogs" are also used. Both conventional shoes and "clogs" attached to the hoof by nailing into the hoof wall or by gluing. Conventional shoes provide little in the way of "breakover" modification and "clogs" provide no cushioning of the hoof. One commercial shoe that has found acceptance is sometime called a "banana" or "rocker" shoe or clog. This is a shoe that is shaped to allow breakover adjustment by a "rocker" effect of the sole of the hoof so that the horse can more easily find a comfortable position—by adjusting the palmar/planar angle to take pressure and stress off affected areas of the hoof.[1]-[5] The "Clog" is a shoe developed by Dr. Michael L. Steward, DVM of Oklahoma, who was one of the first to use the concept of a self-adjusting wooden shoe that is screwed and/or glued directly to the hoof. [6] Adaptations of the Stewart Clog have been made, including variations made of other materials.[7], [8] These shoes, while somewhat effective, are attached directly to the hoof and are not easily changed without damage to the hoof. They do not allow access to the underside of the hoof when in place.

Furthermore, conventional equine shoes are peripherally loaded and, thus, concentrate all force around the perimeter of the foot. For example, as an equine turns, the entire reaction force is on a portion of the hoof wall, and so creates a lever arm that amplifies the torque on joints, tendons, and ligaments. Particularly in equines that have compromised tendons, ligaments, joints, or hoof structure (such as in laminitis and navicular disease), this can not only prevent healing, but cause increased pain and exacerbate existing damage.

What is needed is a shoe that is stable, has a cushioning effect for the legs, covers substantially all the underside of a hoof, provides breakover modification and allows access to the underside of the hoof without removing the shoe. It is also needed that the shoe keeps the reaction force as close to the moment axis as practicable. It is also desirable that the shoe may be applied by an owner or veterinarian without the need for a specialized farrier to "fit" the shoe. The present invention is a shoe, shoe assembly, and method of therapy that, in various embodiments encompassed herein, provides these benefits.

BRIEF SUMMARY OF THE INVENTION

This invention is an equine solid structure, multi-density, multi-strata, hoof shaped shoe that covers substantially the entire underside of a hoof and, in some embodiments, has a relatively small opening(s) to allow inserting of void filler material between the equine hoof and shoe after the shoe is attached. The shoe is sloped on the underside to allow the hoof to roll forward, or to the side, without unnecessary torque, thus allowing an equine to find a comfortable natural position to relieve stress on a sore, injured or diseased hoof. The convex nature of the underside of the shoe also provides for keeping the reaction force on the hoof applied as closely as possible to the moment axis of the bony column of the leg, thereby reducing or eliminating lever-arm amplification of the reaction force on the hoof. The structure is multi-density construction with a relatively thin hard stratum on the top and a thicker softer stratum below; the harder component attaches to the hoof and acts to stabilize the softer lower section. The invention encompasses a kit comprising the described shoe and a method of applying it to equine hooves. The invention also, in some embodiments, comprises a method of treating insulted (e.g. injured, diseased, sore, etc.) equine hooves.

BRIEF DESCRIPTION OF THE DRAWINGS

Various embodiments of the present embodiments are described with reference to the following FIGURES. Like reference numerals therein refer to like parts throughout the various views unless otherwise specified. Embodiments and portions of embodiments illustrated and described herein are non-limiting and non-exhaustive.

DETAILED DESCRIPTION OF THE INVENTION

Figure 1A:
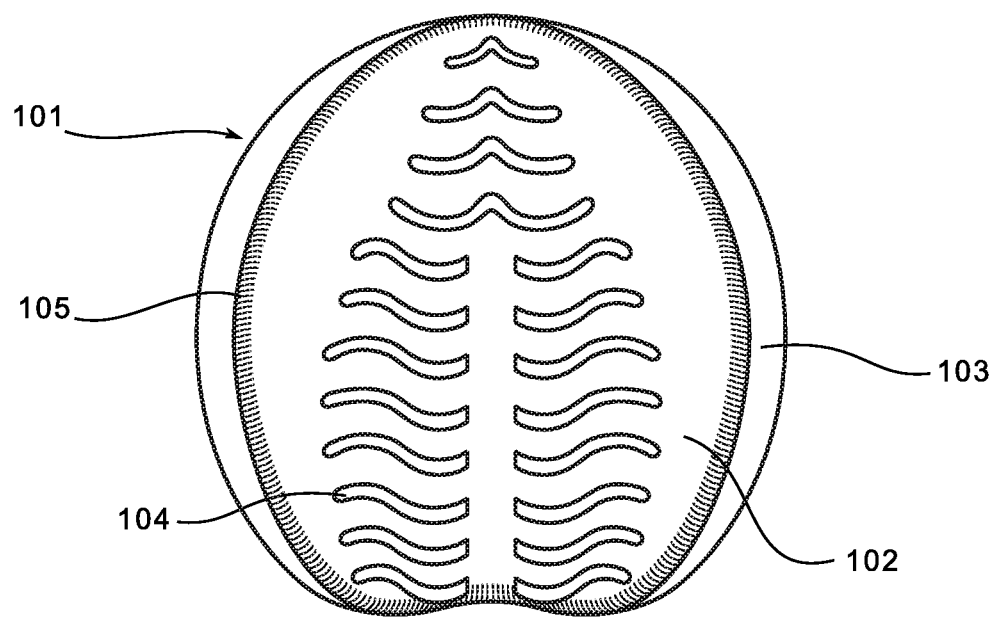
FIG. 1A is a bottom plan view of an embodiment of an equine shoe.
Figure 1B:
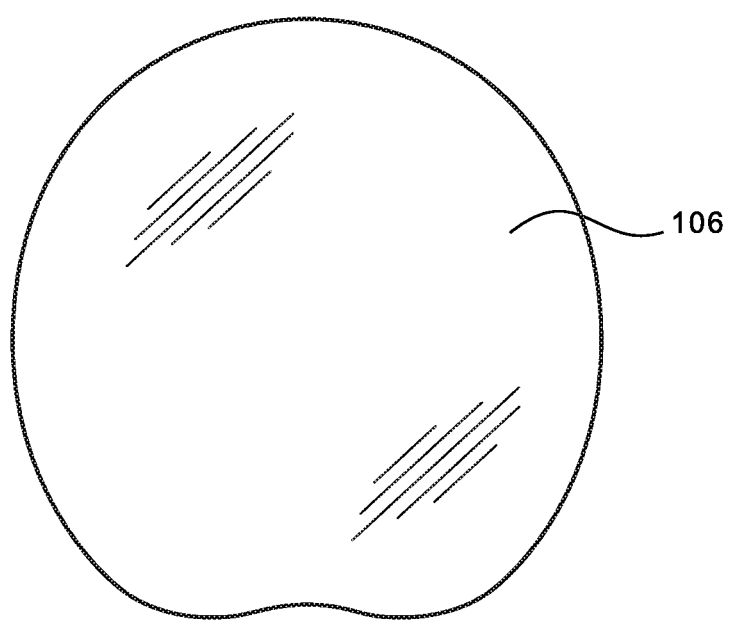
FIG. 1B is a top plan view of an embodiment of an equine shoe.
Figure 1C:
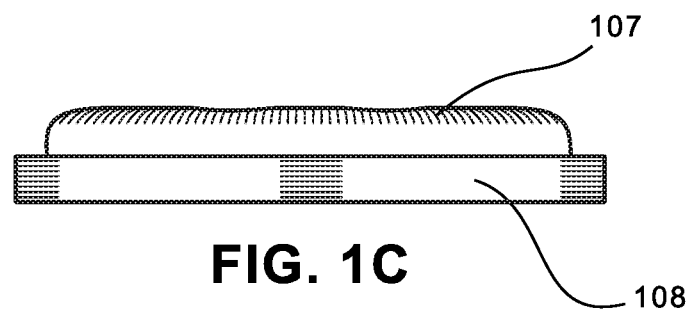
FIG. 1C is a front elevation view of an embodiment of an equine shoe.

The following description of various embodiments of the invention, combined with the associated drawings, enables persons of ordinary skill in the art to both practice the preferred embodiments of the invention, and to understand related applications and embodiments of the invention that may not be specifically set forth, but are encompassed by the specification and claims.

General Embodiment

Embodiments disclosed herein relate to an equine shoe structure and equine shoe assembly having a solid member that covers substantially the entire underside of a hoof. The solid member has multiple strata. At least part of the bottom surface of the solid member is a convex surface providing break-over modification, and at least some portion of the bottom surface is patterned.

In preferred embodiments, at least the uppermost stratum is configured to receive adhesive materials by being textured on a top surface and a side perimeter surface (e.g. 108, 208, 306, 406, 905).

In preferred embodiments, the solid member has at least one port (opening) extending through all strata of the solid member. In some embodiments of the invention, the equine shoe assembly provides a cushioning effect on the hoof and legs. In some embodiments, port(s) provide access to the underside of the hoof without removing the shoe. In embodiments with a port(s), a plug(s) is provided that fits into and seals the port(s).

In preferred embodiments, a void filler material is provided between the top solid structure and the hoof. In some such embodiments, the void filler material is introduced through a port and disposed between the top solid structure and the hoof.

In some embodiments, the void filler material comprises a custom orthotic insert.

Various combinations of the different elements of embodiments of the invention as herein defined will be obvious to those in the art as appropriate for the specific application and environment of use, as set forth herein.

Solid Member

Size & Shape

The shoe structure of the shoe assembly is laterally shaped like the underside of an equine hoof and is sized to cover substantially the entire hoof underside, such as in embodiments disclosed in co-pending application, U.S. Ser. No. 15/274,350, publication no. U.S. 20170027150 A1 on Feb. 2, 2017, the disclosures of which are incorporated by reference herein for all purposes.

The shape and size can be pre-made to order or, when constructed of a molded elastomer, the shoe may be customized on-site, if desired, to an individual equine hoof shape with standard farrier tools such as a rasp and knives. An advantage of the shoe is that it may be attached by an owner or veterinarian without need of a custom fit by a farrier.

In the illustrative embodiments shown in the Figures, as an example of appropriate dimensions for particular equines, the length—front to back—of the shoe is about five and one-half (5.5) inches, the width about five and one-quarter (5.25) inches, the slope begins about one and one-half (1.5) inches from the front of the shoe and the thickness of the shoe, at the center, is about one (1) to one and one-half (1.5) inches. These dimensions will vary to accommodate shoes for the various sizes and shapes of equine hoofs, and for different applications.

Construction

Figure 1D:
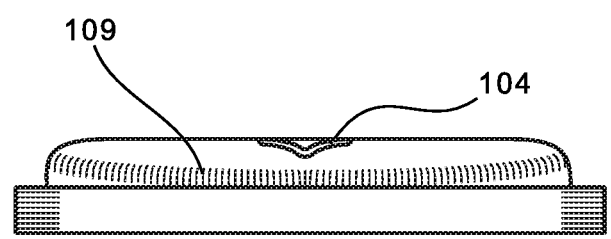
FIG. 1D is a rear elevation view of an embodiment of an equine shoe.

The shoe structure, as shown, for example, in FIGS. 1A, 2A, 3A, and 4A, has a hard stratum (108, 208, 306, 406) at the top of the structure and a softer lower stratum below (102, 202, 305, 405). The shoe structures shown, for example, in FIGS. 1D and 2D have a sloped front (109, 209). In another embodiment, the bottom of the shoe is sloped in front and rear, making a somewhat symmetrical (front to back) "rocker." Equine boot attachments with some similarities are disclosed in co-pending applications, U.S. Ser. No. 15/285,399, publication no. US 20170172134 A1 on Jun. 22, 2017, and U.S. Ser. No. 15/051,343, publication no. US 20160165871 A1 on Jun. 16, 2016, the disclosures of which are incorporated by reference herein for all purposes.

Material

The solid member (101, 201, 301, 901), may be of any suitable moldable material. Molded polymer material, such as polyurethane, is preferred. It is an advantage that the polymer shoe may be easily shaped and custom-fitted to an individual hoof by a common farriers' rasp—no special tools are required.

Molded elastomer enables an attending practitioner to further customize the device for each patient, after looking at radiographs or other imaging means to view the position of the coffin bone relative to the ground level and watch the horse's movement with the device. Molded polyurethane is very suitable and convenient to work with. An important advantage is that in some embodiments the hardness can be adapted to the individual need of the horse to which it is applied. Polyurethanes are easily moldable in open molds or by injection molding. Other polymer materials with similar characteristics as polyurethane, such as polyvinyl chlorides, styrene butadiene styrene polymer, epoxies and the like, are also usable. Choice of these will be well within the ability of those skilled in the polymer art to select.

Upper Stratum

The hard upper stratum (108, 208, 306, 406) is a layer of about one-sixteenth (1/16) to one-half (1/2) inch layer and should not be so hard as to be brittle and break in use but very rigid compared to the remainder of the shoe. It should not be so hard as to be brittle and easily broken but hard enough to provide good support and dimensional stability the lower softer section. In embodiments which are glued to the hoof, it is preferred that the top section have a hardness similar to the hardness of the equine outside hoof wall, because similar hardness materials are more easily bonded by adhesive.

Shore A hardness of about eighty-five (85) or higher is suitable for the top section and about ninety (90) to ninety-five (95) preferred. Shore A "is used for flexible types" of elastomers [9] while the higher number reflects a higher hardness within that range, thus, illustrating well the characteristics of the upper stratum as "rigidly flexible." In other words, the upper stratum is a flexible-type elastomer to provide adequate flex, while being rigid enough to support the weight of the hoof around the edge of the top surface of the stratum.

The hard top holds the softer bottom together, stabilizes the structural integrity and provides dimensional integrity and prevents the softer section from spreading laterally and distorting when in use. It also stabilizes an unstable compromised hoof wall. Without the hard section bonded (at interface 105, 205) to the soft section the softer shoe would not be possible. The hard top also provides a more suitable surface for attachment of to the equine hoof.

Additionally, the hard top allows some measure of flex when the equine steps down on the shoe. The hoof wall applies a force down generally around the perimeter of the upper stratum (the hard top), while the reaction force of the ground on the convex surface of the bottom of the shoe pushes upwards generally towards the center of the upper stratum. The upper stratum, being rigidly flexible, accordingly flexes upwards, towards the equine hoof, generally in the center of the shoe. The degree of flexibility—determined in part by the density of the upper stratum—determines how much flex occurs, along with other factors, such as the weight of the equine, the amount of the equine's weight applied to that hoof, the rate of application of the weight, the nature of the ground, etc. Such flex in some measure mimics benefits of soils such as sand, and can be effective in pumping the hoof's sole, frog, or both, or some portion thereof, thereby potentially increasing stimulation and blood flow in the hoof and limb, due to the known function of the frog as an auxiliary blood pump. There is also evidence that the stimulation so provided contributes to an increased depth of sole, and an overall healthier hoof.

Rigidity of the hard top layer is chosen, in various embodiments, by the amount of flex desired, the amount of "pumping" action desired, etc. It is bounded by the requirement of longevity (increasing flex is at least partially inversely related to longevity of the layer), and to maintain structural integrity during the intended activity for the equine while wearing the shoe. Excessive flexibility can, for example, cause buckling of the top layer and, thus, the whole shoe, particularly when running or performing more strenuous activity. The particular rigidity required is determinable by those of skill in the art.

It should be noted that various ranges provided herein—such as proportions in various examples of convex surfaces, density ranges, and other indicated measurements—are definitional. Such ranges are not selected from previously known ranges, but generally define the requirements for the expressed functionality to not be compromised. The context and function of the various ranges given herein will indicate their importance and their function as definitional ranges.

The thickness of the shoe at its thickest (measured top surface to bottom surface) is generally about one (1) to one and one-half (1.5) inches. The top hard layer of typically about one-sixteenth (1/16) to one-half (1/2) inch thick and preferably about three-eighths (3/8) inch thick will constitute about five (5) to thirty (30) percent of the total shoe thickness.

In some embodiments, the upper support stratum is the uppermost layer of the shoe. In other embodiments, one or more additional full or partial layers are above the upper support stratum, such as a cushion layer, traction layer, grip layer, toe support, frog support, etc.

Lower Stratum

It is desirable that the softer lower section of the structure that is in contact with the ground when in use be of Shore A hardness of about forty-five (45) to seventy (70), with about forty-five (45) to sixty-five (65) being preferred, and sixty (60) being ideally preferred. This softer section helps to cushion the hoof and leg and reduces the extreme concussive force on the legs that exist with metal and hard bottom shoes. The softer lower section also gives the shoe better ground grip.

Example Construction Method

A very useful multi-density shoe structure made primarily of multi-component polymers (such as polyurethane composed of components suitable to give the desired hardness) is easily produced in an open mold with the following general steps:

(1) the components of the softer section are mixed and dispensed (for example, injected or poured) in an open mold (in some embodiments, the components are mixed during dispensing);

(2) the polymer is allowed to partially, but not completely, cure;

(3) the components of the harder top section are mixed and dispensed into the mold on top of the partially-cured softer section (in some embodiments, the components are mixed during dispensing).

The bottom of the mold may be designed to provide any desired pattern on the underside of the soft section. The hardness can easily be adapted to the individual need of the equine to which it is applied by selection of the polymer composition and curing conditions. Additional strata and other components, such as therapeutic compounds, lighter density particles, and other desired components, are incorporated in the method and resulting structures in various embodiments.

Two-Part Shoe Assembly

In some embodiments the solid member is made in two separate pieces—one more rigid member providing support, and a softer, shaped rocker attached to the more rigid solid support member. Such an embodiment, adapted for a shoe to be attached as part of a leg cast, is illustrated in a different application in FIG. 12 of US published application U.S. 2015/0088042, published Mar. 26, 2015 (incorporated herein by reference), where part 405 is the rigid solid member and 410 the attachable shoe straps 402, 406 and 408 are shown (which would be absent in at least some such embodiments as contemplated herein). As shown, 410 (having the same two-density structure as described above with 411 lower section and 411 harder upper section), is attached to the solid member base 405, by barrel screws (415 and 416), but it may also be attached in other ways as by adhesives, horse shoe nails, direct bonding and the like. A suitable solid support member in a two piece arrangement will be a polymer (preferably polyurethane) of a Shore A hardness of eighty-five (85) or harder, somewhat analogous to the uppermost stratum previously described.

Figure 6:
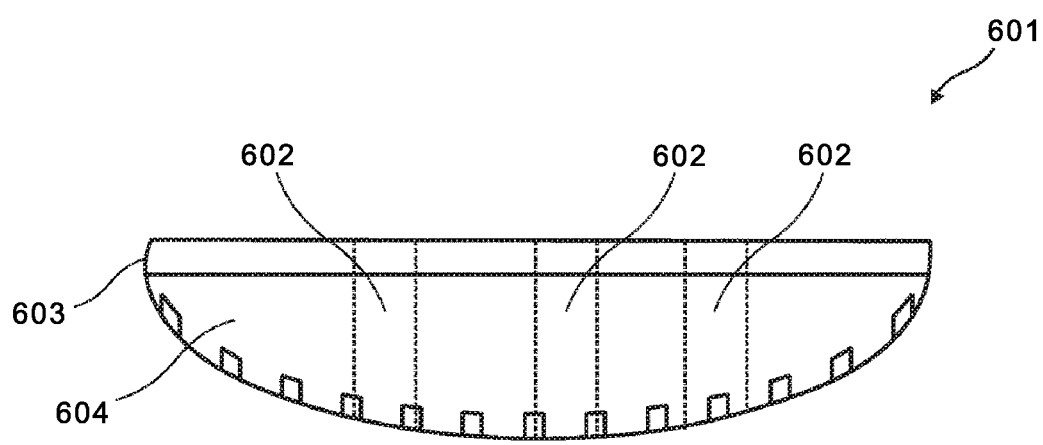
FIG. 6 is a side elevation view of an embodiment of a rocker attachment.

In another such embodiment, a multi-stratum rocker is attached to a rigid member that will be against the hoof. FIG. 6 illustrates such an embodiment, with rocker 601, optional upper stratum 603, softer rocker lower stratum 604, and holes 602 for attachment (for example, by bolts or screws) to the rigid member (analogous to the rigid upper stratum in multi-stratum bodies in other embodiments) that is placed against the hoof.

Attachment

The shoe assembly can be attached to an equine hoof by conventional nailing, screwing and gluing. Suitable techniques for such attachment are well known in the art.

Nailing

In some embodiments, the material used for the upper stratum has a toughness suitable for nailing—as described elsewhere herein—being sufficiently rigid to hold the nail heads without pulling through, while also being flexible enough not to crack, split, or otherwise prematurely fail during nailing and use. This represents a significant advancement in the field of equine shoes, particularly when combined with the other elements presented in embodiments of the invention herein.

Wrapping

The shoe may be temporarily attached to the hoof for radiographic study using various materials including: veterinary stretchable bandaging wrap such as Vetrap from 3M, adhesive elastic tape such as Elasticon by Johnson & Johnson, and stretch wrap film such as Uline's Heavy Duty Goodwrappers® 120 gauge, 3" wrap with included dispenser H-761 (item no. S-6141) or Uline's house brand Heavy Duty Mini-Wrap—100 gauge, 3" (item no. S-4211). In some embodiments, such as that tested with a prototype by one farrier, a shoe is attached to a horse's hoof by screws in the front of the hoof, thereby stabilizing the hoof temporarily, then wrapping the hoof and sides of the shoe with traditional casting tape. Attaching the shoe with casting tape minimizes damage to the hoof (as could result from nailing the shoe to the hoof) and provides an attachment that can be easily replaced (in many cases, shoes need to be replaced or reset about every three (3) to six (6) weeks because of hoof growth).

Adhesive

In some embodiments, the shoe is glued onto the hoof. Some farriers and veterinarians use stretch wrap as a means to smooth out the application of a glue on shoe, like the Sigafoos™ shoes, while the glue is setting. Suitable glues are readily available and include both acrylic-based glues and urethane-based glues. Both are two-part glues in which curing is achieved by a chemical reaction between the two parts. Equilox™ and Equibond™ are examples of suitable commercial shoe glues.

In some embodiments, at least the top surface (e.g. 106, 206) is textured to facilitate gluing to a hoof, facilitate attaching by adhesive bandaging or fixtures, or other attachment methods relying on surface texture. In some such embodiments, the texture provides advantageous adhesion by casting tape, glues, and urethane fillers. In some embodiments, the top stratum—including both the top surface, and the perimeter of the side of the top stratum—is surface profiled such that it is scored or otherwise roughened. In a suitable prototype, the top of a polyurethane shoe was scored using a very course (approximately thirty-six (36) grit) sandpaper on a belt sander. Other methods of texturing or otherwise preparing the surface to aid in producing a better glue seal are suitable in at least some embodiments.

Convex Bottom

The shoe structure has a sloping front (e.g. 109, 209) to allow it to tip forward from a point desirably located below a point near the front of the distal phalanx, P3 (coffin bone). In a general embodiment, it is desirable that the break-over be within one (1) to two (2) inches, front to back, on the shoe from the front point of P3. The ideal point, in most cases will be at or within one-half (½) inch of the front of the P3. A convenient way to locate the front of the coffin bone is to draw a perpendicular line down from the hair line of the coronet band of the hoof; where this line intersects the shoe will be the ideal break-over point. Break-over, as the term is used herein, is the last point of the hoof or shoe to come off the ground when the horse is moving.

The angle of slope is generally from about fifteen (15) to forty-five (45) degrees and preferably about thirty (30) degrees. The shoe may also be sloped in the rear in the same manner as the front. The shoe may be rounded in the rear or may be sloped in front and rear making a somewhat symmetrical (front to back) "rocker." This double-sloped structure is less stable and requires the equine to adjust to the "rocking" effect, thus, providing more exercise and stimulation to the leg and hoof. The shoe bottom may also be sloped from side to side, and will in preferred embodiments be rounded on transition edges (e.g. 107, 207) and, in some embodiments, at interfaces (e.g. 105, 205) of the convex bottom.

As used herein, in relation to measurements, distances, angles, ratios, percentages, etc. regarding the shape of the rocker bottoms and other portions of equine shoes, "approximate" and "approximately" are referred to. The measurements are provided to aid in defining the shape and proportions of various embodiments in order to assist in understanding particular applications and embodiments of the invention and to, thereby, assist in gaining an understanding of the invention as a whole. Because of the nature of the geometry of convex surface, the shoe in general, and the highly individual characteristics of equine hooves, the measurements and proportions may vary somewhat and may incorporate some normal measurement error. Therefore, "approximate" is provided to clarify that the measurements are illustrative, and may vary to a degree that is clear to one of ordinary skill in the art, while not departing from the purpose and function of the feature, and the general geometry and proportions disclosed. It does not detract from the enabling nature of the disclosure, nor is it to be used to slavishly confine the invention to particular illustrative measurements.

Importance of Rocker Effect

This rocker shape is especially beneficial for an equine, for example, with laminitis, in moving the break-over (lever-arm of the hoof) back from the front of the hoof, so that pressure is unloaded from the hoof wall to relieve some of the stress on the hoof lamina from holding the downward force of the bony column of the hoof and leg against the upward force from the ground at the furthest point out toward the front of the hoof.

Without this "rocker" effect the pressure in the front hoof wall increases when the hoof is tilted forward. Longer hooves have an even more pronounced effect. The further forward the break-over is, the more levering there is placed on the foot and potential strain on the entire back portion of the limbs. The rocker shape allows the pressure to be unloaded from the hoof wall.

Thus, modification of break-over greatly reduces the pressure exerted on the leg, especially with equine with longer hooves. Audrey Pavia explains in the American Farriers Journal that: "Horses with a long sloping pastern have a ground reaction force vector that is longer, with larger forces in the tendon. With a longer toe, the ground reaction force moment arms get bigger, and force on the tendon grows. Calculations show that 1 centimeter of toe length in an average Thoroughbred comes to 50 kilos of force acting on the tendons." [10] Moving the break-over can easily have the effect of shortening the hoof length.

An additional advantage of the "rocker" shape is that it greatly reduces the surface area in contact with the ground or other surface onto which the equine stands. For example, a typical shoe may have a ground-engaging area of approximately six (6) inches by six (6) inches to eight (8) inches by eight (8) inches, or about thirty-six (36) to sixty-four (64) square inches. A suitable rocker bottom in some embodiments will have a ground engaging surface of approximately four (4) inches by four (4) inches to four (4) inches by five (5) inches, or sixteen (16) to twenty (20) square inches, which is only about thirty (30) to forty-five (45) percent of the ground-engaging area of the shoe. A smaller shoe will reduce ground contact even further, as will a more domed convex surface.

In some embodiments, lateral break-over (sloping from side to side) is provided, which eases the stress on hoof structures during turning and helps eliminate the rotational torque on, for example, compromised lamina. A tell-tale way to determine if a horse has laminitis is to walk the horse in tight turns that exacerbates the effects of the disconnected lamina. Accordingly, reducing rotational torque mitigates the effects of the disconnected lamina.

Reaction Force Centering

Figure 10A:
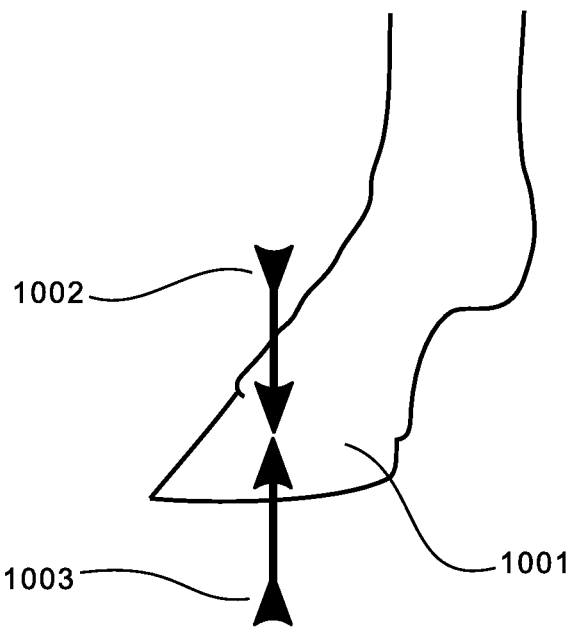
FIG. 10A is a simplified schematic of forces acting on an equine hoof.
Figure 10B:
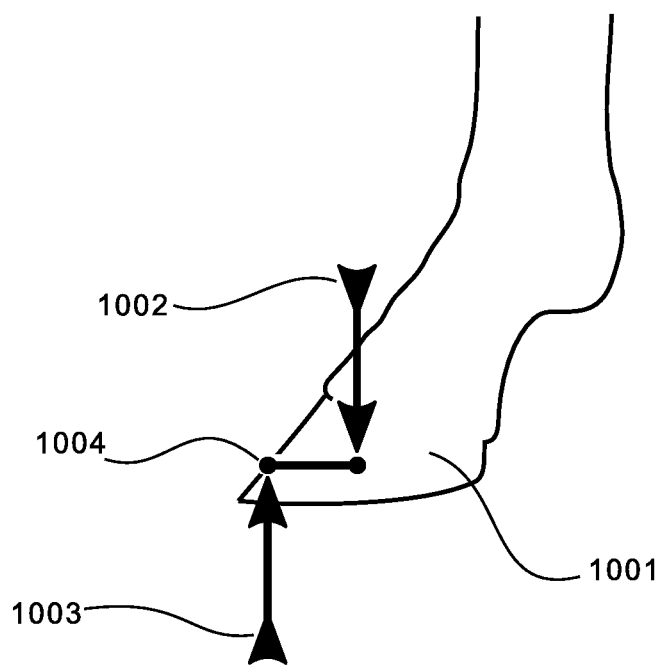
FIG. 10B is a simplified schematic of forces acting on an equine hoof.

In an equine hoof, the forces can be represented in a simplified manner as two point loads (see FIGS. 10A and 10B): (1) the load force, 1002, being applied by the bony column of the leg to the hoof, and (2) the reaction force, 1003, from the ground, on the hoof 1001. In reality, both are distributed loads, particularly the reaction force, as it is typically spread over some or all of the equine's hoof wall. When the equine is standing, the forces approximately intersect: the load force is directed downward and is applied to the hoof primarily by the coffin bone and the reaction force is directed upward against substantially all of the hoof wall. The reaction force can be simplified to a point load which is directed upwards, normal (perpendicular) to the ground, along an axis approximately coinciding with that of the load force.

When the equine moves, however, the force axes often no longer intersect. In turning—especially at a run—for example, the load force is still centered downward into the hoof by the bony leg column. The reaction force, however, is being effectively applied to a smaller section of the hoof wall, and can be simplified to a point force acting along an axis normal to the ground, and significantly farther out on the hoof from the load force axis. This creates a lever arm 1004, which creates an amplified torque on the tendons, ligaments, and other hoof structures.

These concentrated forces and resulting torque can be especially large during breakover. As used herein, breakover is the point the hoof leaves the ground. Moving the break-over point can drastically change the effective stress on the various structural components of a hoof by reducing the lever arm and, thus, reducing the torque applied by the reaction force. For example, when the horse walks forward, as the hoof begins to pivot forward onto the toe, the reaction force shifts from being distributed around more or less the entire hoof wall, to an increasingly small portion of the toe. As the hoof pivots onto the toe, the ligaments, tendons, etc. must counteract increasing reaction force from the toe in order to keep the hoof oriented properly as the equine walks forward. It can easily be seen that moving the point of breakover backwards toward the center of the hoof reduces the lever-arm and, thus, the torque, resulting in less stress on various ligaments tendons, laminae, and other hoof structures.

The same principle also applies to lateral (side-to-side) breakover related forces, often encountered during turning, where a side or front-and-side (e.g. at approximately a ten-o-clock or two-o-clock position when viewing the underside of the hoof and taking the toe as twelve-o-clock) of the hoof wall receives the concentration of the reaction force during some part of the gait.

According to Dr. Hilary Clayton: "In racehorses that accumulate a large mileage at high speed, impact shock is likely to be an important etiological factor in breakdown injuries . . . Sport horses train at slower speeds than racehorses, leading to lower impact shock and, consequently, the effects may accumulate for many years before becoming clinically apparent . . . Even at relatively slow speeds of around 4 m/s the hoof experiences impact accelerations in the order of 80 to 100 g." [11]. In particular, during the loading phase of the gait, "Due to its dependence on coffin joint angulation, the [distal check ligament of the deep digital flexor tendon (DCL-DDFT)] is particularly sensitive to changes in hoof angle and toe length, and to different surface types particularly with regard to the ability of the hoof to rotate during the stance phase."

Furthermore, "On a softer surface the toe rotates into the surface prior to heel off which reduces tension in the DCL-DDFT and navicular ligaments. This, in turn, reduces pressure in the navicular region. Therefore, a surface that allows the toe to dig in during push off is usually beneficial in horses with navicular syndrome or other types of caudal heel pain. Toe off is the instant at which the toe leaves the ground, after which the elastic tendons and ligaments are able to recoil in an unrestrained manner."

The convex surface of the equine shoe of this invention provides a dome effect, whereby the reaction force is kept centered under the hoof as much as possible (as in FIG. 10A), aligning the reaction force axis more closely with the load force axis and, thereby, minimizing the resulting moment. Reaction force centering is integral with modification of breakover, as discussed elsewhere herein. Reducing the moment reduces the resulting forces on hoof structures—particularly on the lamina—and, thus, reduces insult in healthy and injured horses alike. One study noted that when simply rounding the toe of a standard shoe: "There was an improvement in the ease of movement to roll over the toe in the shoes with a rolled toe, due mainly to a smoother hoof unrollment pattern. The peak indicative moment decreased substantially at the onset of breakover in the shoe with the rolled toe . . . " [12]. It is clear that providing a convex underside likewise reduces moment in the hoof across a broader range of motion. Furthermore, the convex surface provides some of the same advantages as a soft ground surface, in that force is kept distributed across the entire hoof as much as possible, reducing the peak forces during breakover, as the hoof is free to rotate over a range to keep the reaction force as central as possible. Effectively, the beginning point of breakover is brought inwards, towards the center of the hoof. In shoes with ground-engaging surfaces which are substantially entirely convex surfaces, the breakover point is brought inwards in substantially all directions.

Furthermore, providing a dome (convex surface) for an equine to walk on also isolates rotational torque, reducing the torque acting on various hoof components during turning by reducing the lever arm over which the reaction force from the ground is acting. The example rocker bottoms all provide a measure of isolation of rotational torque, although example rocker bottom 1 and example rocker bottom 3 do so to a greater degree.

The multi-stratum construction of the shoe is important to provide reaction force centering, as the upper stratum must be sufficiently rigid to distribute the centered reaction force across the underside of the hoof, while the lower stratum must be soft enough to adequately engage the ground surface, and must provide traction, and yet must transfer the force to the upper stratum and must be durable enough to hold up to repeated loading and unloading during standing, walking, running, turning, and other activities and stresses.

Embodiments having different convex shapes are illustrated (FIGS. 1A-2F). FIG. 2A-2F illustrates an embodiment having a convex shape, being a low-profile dome shape suitable, for example, for pasture, paddock, and pen, and activities such as cutting and roping. It is also suitable for conditions including navicular disease, ringbone, sidebone, and ligament and tendon problems. This shape is particularly useful for some equines with navicular disease, as the combinded fore-and-aft rocker and lateral rocker effect of the dome lessens the moment necessary for the navicular bone to resist during turning. It is also useful for senior equines. In some embodiments, the top stratum extends far enough out to provide a lip (103, 203) for casting tape, stretch wrap, elastic bandaging, etc to catch the shoe and hold it on the hoof, such as when applied temporarily to try if it works well for the equine.

Another embodiment provides a different convex shape, being a moderate mechanics shape suitable, for example, for use in arenas and performance, as well as in various conditions such as those discussed previously. The shape provides a moderate-profile dome bottom.

Another embodiment, similar to the shape shown in the rocker attachment of FIG. 6, provides a "super-rocker," with maximum fore-and-aft rocker effect, but little to no lateral rocker effect. It is particularly useful for laminitic horses, reducing the moment—especially during breakover—that must be resisted by the injured lamina.

Figure 1E:
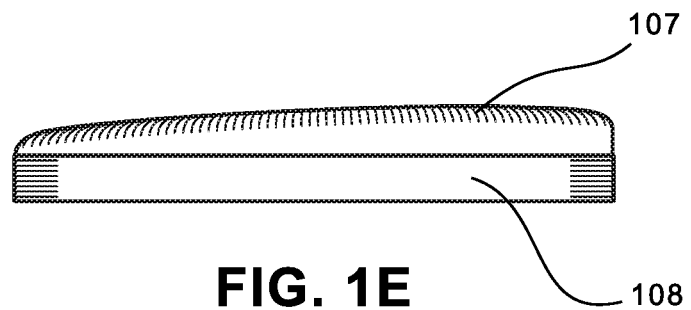
FIG. 1E is a side elevation view of an embodiment of an equine shoe.
Figure 1F:
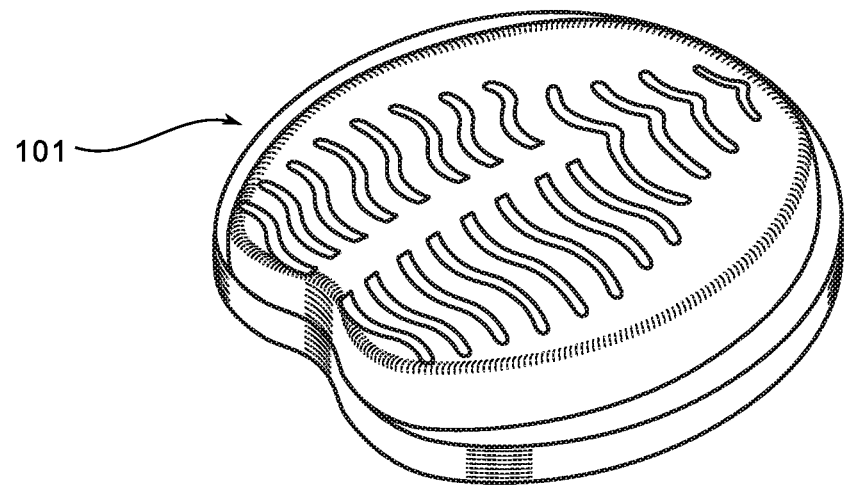
FIG. 1F is a perspective view of an embodiment of an equine shoe.

FIGS. 1E-1F illustrate an embodiment having a convex shape with a low-profile rocker, and little to no lateral rocker effect.

The examples discussed above, are illustrative. Other shapes and mechanical configurations, and combinations of the illustrative and discussed features (such as, for example, the lip in the first convex shape, and the various sole patterns shown and discussed elsewhere herein), as well as other features discussed herein or obvious to one skilled in the art of equine shoes, are contemplated in various embodiments.

Example Rocker Bottoms (Convex Surfaces)

FIGS. 1C-1E, 2C-E, 3B-C, 4B, and 6 are side and end views of a solid member base that is tapered (tapering or sloping, in various embodiments, is a straight taper, a curved taper, and other suitable taperings away from a given plane—and results in various embodiments in a straight slope, a concave surface, a convex surface, and some combination thereof) to form a molded rocker configuration. These Figures show the way the solid member may be profiled in some embodiments. The convex surface of the molded shoe may be varied to provide the specific rocker action desired. Some embodiments have sole shapes which are sloped to the front and sloped to the rear. This allows maximum flexibility of movement and allows the horse more options to find the optimum comfortable position but is least stable of the configurations. This sole shape is useful to enhance self-stretching of ligaments as when preparing for exercise, much like a person stretching the Achilles tendons by leaning on a wall before a run.

It is also suitable to have the sole sloped only to the front, the front will be tapered as shown but the rear will be essentially flat (but rounded/radiused on an edge) from the center of the member to allow more stable footing. This rocker configuration provides the equine a more stable footing in a preferred neutral resting position. The neutral resting position in the rear section of the device enables the horse to have a stable place to rest, yet if there is movement fore-and-aft or laterally the rocker rolls to lessen torque on the tendons, ligaments, and especially on compromised lamina.

Figure 2A:
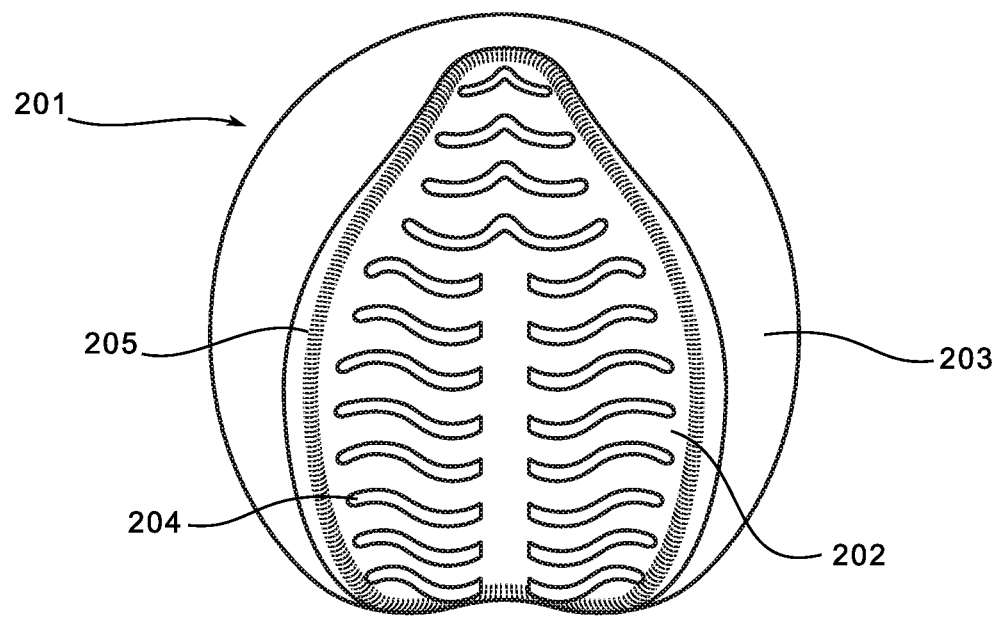
FIG. 2A is a bottom plan view of an embodiment of an equine shoe.
Figure 2B:
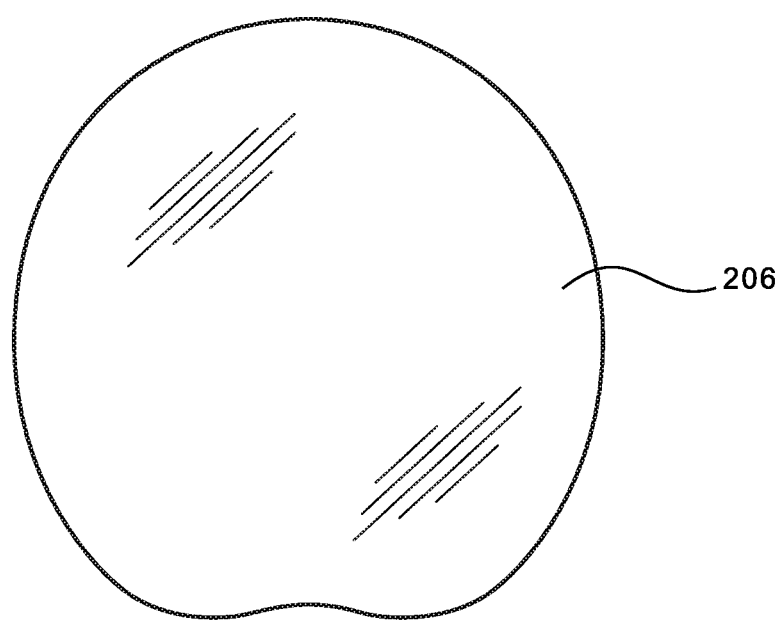
FIG. 2B is a top plan view of an embodiment of an equine shoe.
Figure 2C:
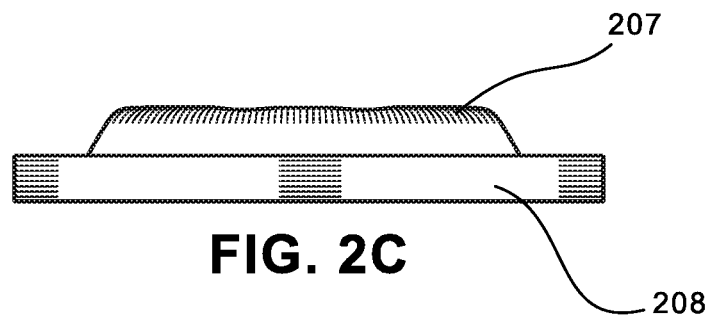
FIG. 2C is a front elevation view of an embodiment of an equine shoe.
Figure 2D:
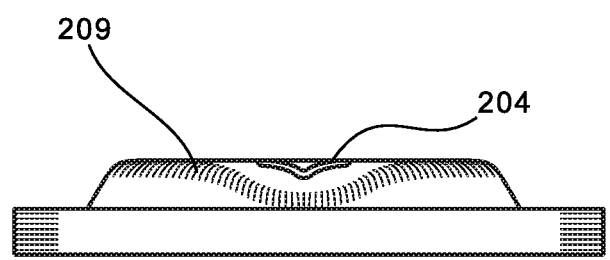
FIG. 2D is a rear elevation view of an embodiment of an equine shoe.
Figure 2E:
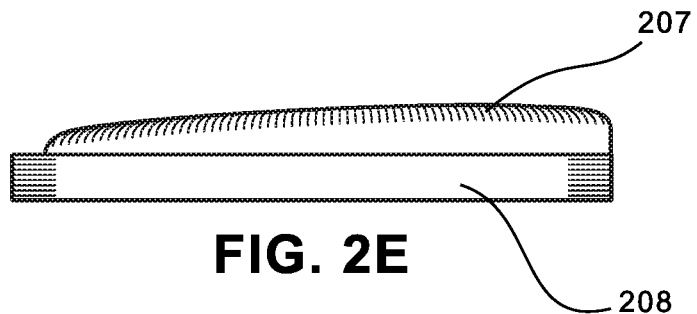
FIG. 2E is a side elevation view of an embodiment of an equine shoe.
Figure 2F:
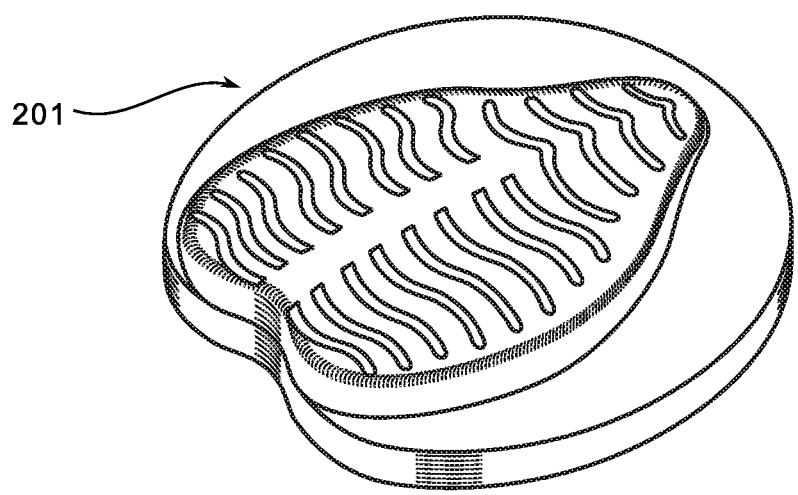
FIG. 2F is a perspective view of an embodiment of an equine shoe.

Both configurations are useful in appropriate situations and both are within the scope of this invention. A narrowed toe of the rocker base (as illustrated in FIG. 2A) enhances lateral break-over and provides the equine with more flexibility of movement. Various ways in which this solid member may be tapered are within the scope of this invention. A number of possible rocker shapes are described in U.S. published application no. 2011/0067366, published Mar. 24, 2011 (U.S. application Ser. No. 12/882,352), incorporated herein by reference for all purposes. The sloped shape on the bottom moves the break-over point back as well as helping isolate the lateral forces on the bone column.

As used herein, a convex surface is a generally sloped or rounded surface—typically referring to the underside, ground-contacting surface, of a shoe described herein. The entire surface need not be convex, but some portion of it is convex in relation to the top surface—in other words, it bows down, away from the top of the shoe and towards the ground—as is required in order to provide a rocker bottom, and as is generally illustrated in the Figures.

Example Rocker Bottom 1:

In some particular embodiments described, when viewing the shoe from underneath the hoof and oriented such that the toe of the hoof is at twelve-o-clock, the rocker bottom comprises a generally convex surface. The point at which breakover begins (breakover point) for forward motion (walking straight forwards) is approximately one inch back from a normal, flat horseshoe, thereby shortening the lever arm. The convex surface allows breakover to happen more gradually, as the hoof rolls forward, still supported closer towards the center of the hoof than with a normal horseshoe. The lateral (side-to-side) breakover point is also moved inwards. In particular, when viewed from underneath, there are two 'scooped-out' areas of the convex surface at approximately ten-o-clock and two-o-clock, thereby moving the semi-lateral breakover point further back to the center of the hoof when the equine is turning to the left or right. In this way, the equine initiates the turn, and the hoof can pivot accordingly, while the entire hoof wall (and potentially the sole as well, in some embodiments with support structure material) is still being supported instead of transferring all reaction force to a small portion of the hoof wall. Such an embodiment is shown in FIGS. 2A-2F.

In some such embodiments, the convex surface comprises a landing area which is, when viewed from underneath the shoe, bounded on a left and right side by two compound curves, a left curve and a right curve, running generally from the heel to the toe; the compound curves, in relation to a centerline running from the heel to the toe of the shoe, each comprise: (a) a concave curve, curving towards the centerline, nearer the toe and, (b) a convex curve, curving away from the centerline, nearer the heel. The landing area so bounded is gently convex from left to right, allowing the shoe to rock side to side no more than five (5) degrees from horizontal when the shoe is substantially horizontal to a ground plane. A center of the concave curve of the right curve and left curve is located approximately at sixty (60) degrees and three hundred (300) degrees from the centerline, respectively, measuring clockwise starting at the toe. The convex surface is three-eighths (3/8) to three-quarters (3/4) of an inch thick. A minimum width between the compound curves occurs further towards the toe than a maximum width between them, the minimum width being sixty (60) to seventy (70) percent shorter than the maximum width. The uppermost strata extends leftward and rightward past the landing area, creating a lip, the lip extending beyond the landing area a distance of twenty-five (25) to thirty-five (35) percent of the maximum width.

In a particular such configuration, size 1, the shoe is approximately five and five-eights (5.625) inches long, and three and one-quarter (3.25) inches wide at its widest. The convex surface (the rocker bottom) is approximately one and one-eighth (1.125) inches wide, side-to-side, at its narrowest, near the toe. Thus, the width of the narrowest portion is approximately thirty-four and six-tenths (34.6) percent of the maximum width of the shoe. The convex surface is approximately five (5) inches front-to-back. The widest part of the convex surface occurs approximately two inches forward of the heel, and the center of the concave portion of the curve (which corresponds with the narrowing of the convex surface) at the toe, is approximately four and one-quarter (4.25) inches forward of the heel.

In this configuration, the shoe is comprised of two strata—an upper strata and lower strata which comprises the convex surface. The upper, more rigid strata is between one-half (1/2) to five-eighths (5/8) of an inch thick. There is no lip of the upper strata overhanging the convex surface at the very toe of the shoe, but the minimum sideways lip is three-quarters (3/4) of an inch, or 0.75/3.25=approximately twenty-three (23) percent of the maximum width of the shoe. The lip overhanging the convex surface at approximately ten-o-clock and two-o-clock, corresponding with the 'scooped-out' areas, is approximately one (1) inch, or 1/3.25=approximately thirty and eight-tenths (30.8) percent of the maximum width of the shoe. The maximum thickness of the shoe is approximately one and one-eight (1.125) inches thick. Some such embodiments, such as those optimized for attachment to the hoof by adhesive or wrapping, omit some or all of the lip.

Various embodiments of this example are particularly useful for equines with navicular disease (or navicular syndrome) or tendon ailments, as the increased isolation of rotational torque—especially during turning—provided in this example reduces additional stress and insult to already compromised tendons, ligaments (particularly when the collateral ligaments are compromised), and bones. It will be obvious to those of skill in the art that features of this example, and other variations encompassed herein, can be advantageously applied to other situations.

Figure 9:
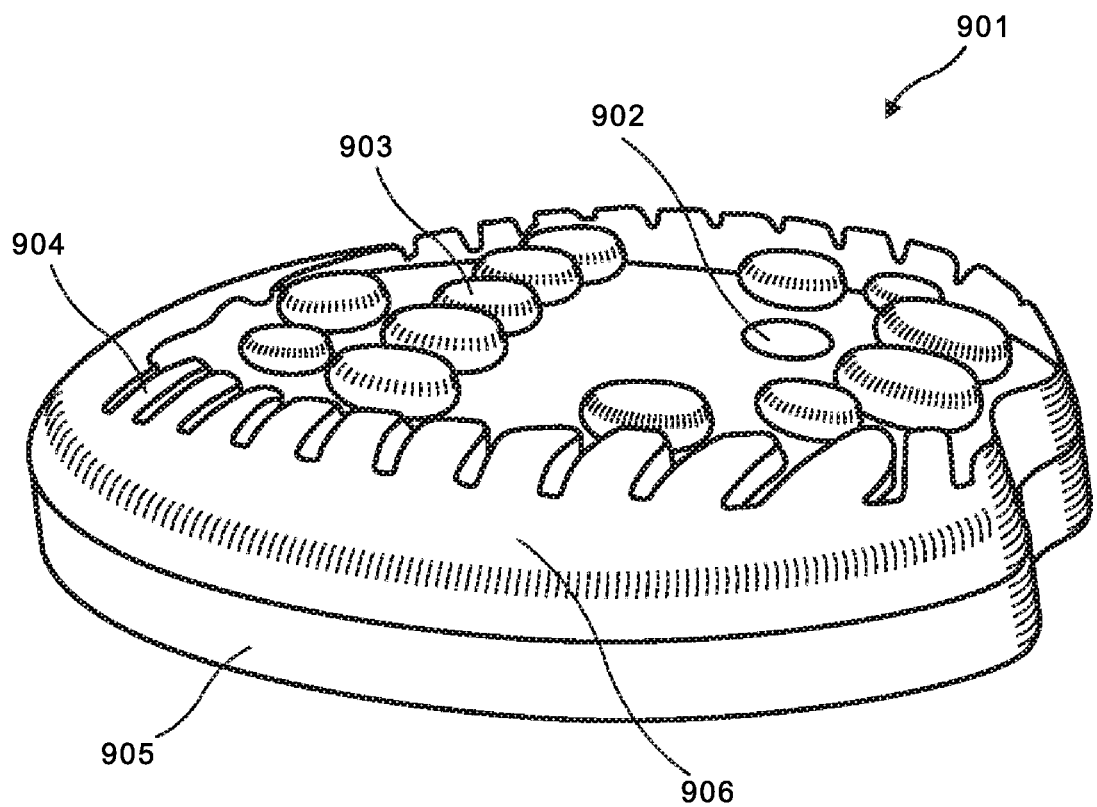
FIG. 9 is a perspective view of an embodiment of an equine shoe having a single port therein.

Example Rocker Bottom 2:

In some particular embodiments described, when viewing the shoe from underneath the hoof and oriented such that the toe of the hoof is at twelve-o-clock, the rocker bottom comprises a generally convex surface. The point at which breakover begins (breakover point) for forward motion (walking straight forwards) is approximately two (2) inches back from a normal, flat horseshoe, thereby shortening the lever arm. The convex surface allows breakover to happen more gradually, as the hoof rolls forward, still supported closer towards the center of the hoof than with a normal horseshoe. The height of the convex surface is relatively high in some such embodiments, to provide more rocker motion, for example, to promote movement of the hoof, to drastically reduce or eliminate sharp breakover points, or a combination thereof. The lateral (side-to-side) breakover modification is minimal, although the convex surface is mildly sloped in approximately the two-thirty and ten-thirty directions, thus, providing a slight movement of the lever arm inward in those directions. The mild lateral breakover modification, combined with the pronounced front-to-back curvature at least towards the toe, provides a generous resting position while still promoting front-to-back (fore-and-aft) rocker motion. A particular such embodiment is illustrated in FIG. 9.

In some such embodiments, the convex surface comprises a convex curve, curved out away from the top surface of the shoe, running from the toe to the heel of the shoe when viewed from a side of the shoe. The convex surface is three-eighths (3/8) to one (1) inch thick at a maximum thickness, the maximum thickness occuring at least at a peak line running from side to side across the shoe, the peak line positioned back from the toe of the shoe between forty (40) to sixty (60) percent of a total length of the shoe. The slope of the convex curve, relative to the top surface of the shoe, increasing in both directions at increasing distance from the peak line towards the toe and heel of the shoe. The convex surface comprises a fore landing area bounded towards the heel by the peak line and towards the toe by a line running from side to side across the shoe and positioned back from the toe of the shoe between twelve (12) and twenty-five (25) percent of the total length of the shoe. The convex surface comprises a rear landing area bounded: (a) towards the toe by a line running from side to side and positioned forward from the heel of the shoe between fifty (50) to seventy (70) percent of the total length of the shoe, and (b) towards the heel by a line running from side to side across the shoe and positioned forward from the heel of the shoe between five (5) and twenty-five (25) percent of the total length of the shoe. Rearward of the rear landing area, the convex surface curves upward towards the top surface of the shoe. The convex surface comprises a rocker toe area forward of the fore landing area, the convex curve configured such that the shoe can roll forward while maintaining contact of the convex surface with a relatively flat ground surface such that the top surface is at angle of twenty (20) to sixty (60) degrees relative to the ground surface before the uppermost stratum touches the ground surface. Left and right sides of the fore landing area, the rear landing area, and the rocker toe area are radiused.

In a particular such configuration, size 000, the convex surface is of maximum thickness approximately along a line running side-to-side across the shoe, and positioned two and one-half (2.5) inches back from the toe of the shoe. The overall length of the shoe is approximately at four and one-half (4.5) inches, so the distance from the toe to the line is approximately 2.5/4.5=fifty-six (56) percent of the overall length of the shoe. The shoe rolls forward to approximately ten (10) degrees (measuring the top surface relative to a horizontal ground plane) while resting on the fore landing area, then engages the roller toe and rolls forward between to about forty-five (45) degrees over the last approximately seven-eighths (7/8) of an inch of roller toe. The overall thickness of the shoe is approximately fifteen-sixteenths (15/16) of an inch. The shoe has an upper strata and lower strata. The more rigid upper strata is between three-sixteenths (3/16) to three-eighths (3/8) of an inch thick. The more flexible lower strata is a maximum of nine-sixteenths (9/16) of an inch thick. Some such embodiments, such as those optimized for attachment to the hoof by nailing, provide a lip as discussed elsewhere herein.

Various embodiments of this example are particularly suitable for equines with laminitis, founder, etc.—especially on the fore feet—because of the combination of a relatively large resting area while still promoting forward and backward motion, while minimizing torque during forward and backward motion and, thus, minimizing the amplified stress on compromised laminae, tendons, ligaments, etc. from normal torque during unmodified breakover.

Example Rocker Bottom 3:

In some particular embodiments described, when viewing the shoe from underneath the hoof and oriented such that the toe of the hoof is at twelve-o-clock, the rocker bottom comprises a generally convex surface. The point at which breakover begins (breakover point) for forward motion (walking straight forwards) is farther backwards from the toe than in Example Rocker Bottom 2. The convex surface allows breakover to happen more gradually, as the hoof rolls forward, still supported closer towards the center of the hoof than with a normal horseshoe. The convex bottom has greater side-to-side curvature than the convex bottom of Example Rocker Bottom 2, while the overall thickness of the convex bottom is smaller. The perimeter of the convex bottom is generally ellipsoid (except in some particular embodiments at the heel, which generally follows the shape of an equine heel), and does not have the 'scooped-out' portions of Example Rocker Bottom 1 at ten-o-clock and two-o-clock.

In some such embodiments, the convex surface comprises a first convex curve, curved out away from the top surface of the shoe, running from the toe to the heel of the shoe when viewed end-on from the toe or heel of the shoe. The convex surface comprises a second convex curve, curved out away from the top surface of the shoe, running from side to side when viewed from a side of the shoe. The convex surface is one-eighth (1/8) to one-half (1/2) inch thick at a maximum thickness, the maximum thickness occuring at least along a peak line running from side to side across the shoe, the peak line positioned forward from the heel of the shoe between twenty-five (25) to fifty (50) percent of a total length of the shoe. Rearward of the rear landing area, the convex surface curves upward towards the top surface of the shoe. The convex surface comprises a rocker toe area forward of the peak line area, the first convex curve configured such that the shoe can roll forward while maintaining contact of the convex surface with a relatively flat ground surface such that the top surface is at an angle of ten (10) to twenty-five (25) degrees relative to the ground surface before the uppermost stratum touches the ground surface. The uppermost strata extends leftward and rightward past the lowermost stratum, creating a lip, the lip extending beyond the lowermost stratum a distance of at least one-quarter (1/4) inch at a widest part of the shoe.

In a particular such configuration, size 000, the overall length of four and three-quarters (4.75) inches, and the overall width is four and one-half (4.5) inches. The convex surface allows the shoe to rock forward, towards the toe, at an angle of approximately fifteen (15) degrees (measuring the top surface of the shoe relative to a horizontal ground plane). The shoe, when parallel to the ground plane front-to-back, rocks laterally (side-to-side) of approximately twelve (12) to fifteen (15) degrees. The shoe, from parallel to the ground plane, rocks in the directions of approximately ten-o-clock and two-o-clock approximately fifteen (15) degrees. The shoe has an upper strata and a lower strata. The more rigid upper strata lips over the more flexible lower strata approximately one-half (1/2) to five-eighths (5/8) of an inch at the toe, or approximately 0.5/4.75=ten and one-half (10.5) to 0.625/4.75=thirteen and two-tenths (13.2) percent the overall width of the shoe. The lip extends a maximum of one-half (1/2) inch beyond the lowers strata on the left and right sides, or approximately ten and one-half (10.5) percent of the width of the shoe. The upper strata is approximately one-quarter (1/4) to three-eighths (3/8) of an inch thick, and the lower strata is a maximum of approximately three-sixteenths (3/16) to three-eights (3/8) of an inch thick.

In a particular variation of this configuration, with a pattern of bosses on the convex surface, the bosses protrude approximately one-eighth (1/8) to one-quarter (1/4) outward from the convex surface, in a direction generally normal (perpendicular) to the convex surface. In this embodiment, the bosses, when on a sufficiently hard surface, provide what can be termed a progressive roller or progressive breakover effect. The shoe rolls forward approximately fifteen (15) degrees, while still resting on a plurality of bosses, then can roll forward, pivoting on at least one boss, to about twenty-five (25) to thirty (30) degrees. The shoe likewise can rock side-to-side to approximately thirty (30) degrees, and to approximately twenty (20) degrees in the two-o-clock and ten-o-clock directions. Such progressive roller effect is highly dependent on the placement, area, height, shape, etc. of the bosses.

Such an embodiment is useful, for example, for performance horses, such as cutters, jumpers, etc., as the more uniformly domed convex surface isolates rotational torque by moving the lever arm towards the center of the shoe in all directions, thereby reducing excessive stress on the hoof wall, tendons, ligaments, etc. during strenuous exercise, as well by providing increased traction with aggressive tread, thereby preventing slipping and the associated potential for insult to the hoof and legs.

Various embodiments of this example, in general, are particularly useful for performance-type activity, such as running, jumping, cutting, etc, because of the inward shift of the beginning breakover point due to the dome and 'scooped-out' areas, which is particularly effective in reducing rotational torque. In some embodiments in this example and elsewhere herein, performance includes not only traditional competitive performance, but also pleasure events, trail events, pasture activity, etc. In other words, 'performance' at least describes activity beyond mere standing, walking on a halter, and being stalled.

Field Customization

The shoe shape of various embodiments of this invention is designed and sized to provide optimum breakover and mechanics for various applications; however, when the solid structure is constructed of a molded elastomer it may also be customized on site of use to an individual equine or individual need with standard farrier tools such as a rasp and knives. As used herein, the term 'solid structure,' 'solid rocker,' 'solid member,' or 'solid body,' when used in reference to the multi-density, multi-strata shoe member, means a structure that is a unitary solid structure that substantially covers the entire sole (underside) of an equine hoof. Such a structure is illustrated in the Figures (such as FIGS. 1F, 2F, and 9).

Patterned Bottom

The drawings shows patterning (104, 204, 302, 402) of the softer lower section of the shoe, and the placement of openings (304, 404). FIGS. 3A-4B, and 9, for example, also illustrate embodiments with patterning of the softer lower section (e.g. 906) of the shoe, with edge pattern (e.g. 302, 402, and 904) and ellipsoid bosses (e.g. 303, 403, and 903). Port 304, 404, and 902 are openings.

Embodiments having different patterns are shown in FIGS. 1A-2F, 3A-4B, and 9. FIG. 1A, FIG. 1F, FIG. 2A, and FIG. 2F illustrate embodiments having a wave pattern of grooves, which is useful for day to day use, as well as roping, cutting, etc.

Some embodiments have a pattern of bosses. Some such embodiments have a pattern comprising bosses protruding outward from the convex surface, thereby creating an effective outer convex surface, as opposed to bosses 903 shown in FIG. 9, which are depressed into a hollow so that the tops of the bosses are generally on the same convex surface as the tops of the grooves. Instead of an overall wave pattern as is shown in FIG. 1A, some such bosss pattern comprises a repetition of bosses of potentially varying size and spacing. Some such boss patterns are open in nature, allowing for self-unloading of dirt, and are particularly useful for arena and performance activities, such as barrel-racing, cutting, roping, etc.

Furthermore, in some such embodiments, the tread is concentrated in the center, and spaced further apart at the edges to provide increased traction when the hoof is centered, while providing more moderated traction when the hoof is rolled to a side or front to prevent excessive traction that can generate excessive loads against the hoof while the hoof and leg is in a potentially weaker position. In other such embodiments, the tread is concentrated generally in rows from toe to heel, such that, for example, a whole row engages as the hoof is at a given angle side to side. In other such embodiments, the bosses are staggered such that an nearly any position, approximately equivalent traction is provided.

Other patterns, advantageous for various applications and situations, will be understood by those of skill in the art as being within the scope of this disclosure, as described and illustrated in the examples, figures, and discussion herein.

Ports

Figure 3A:
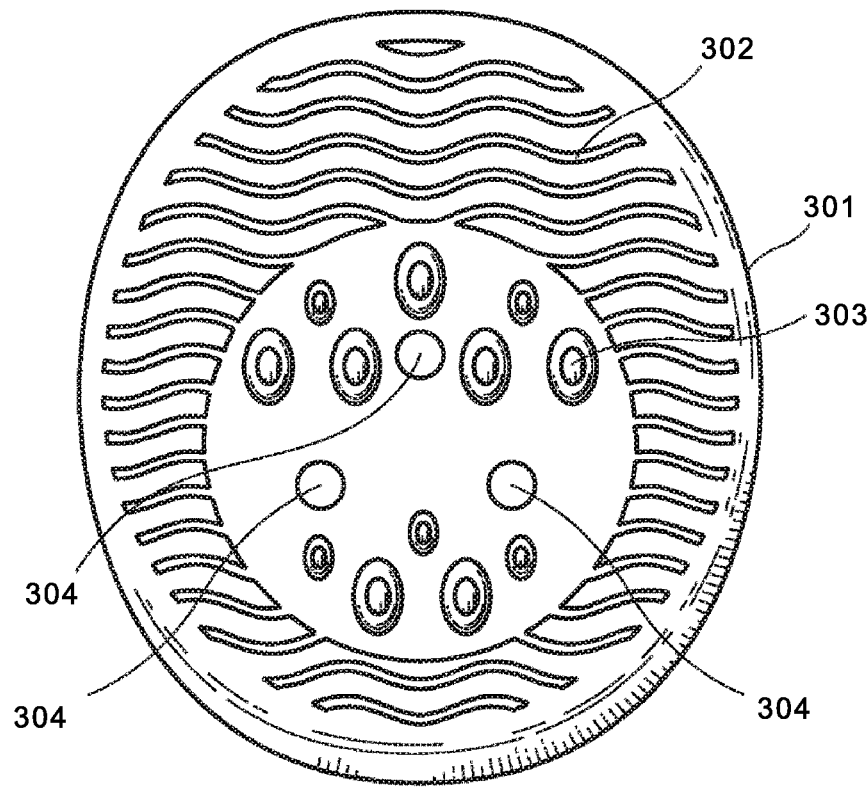
FIG. 3A is a bottom plan view of an embodiment of an equine shoe having ports.
Figure 3B:
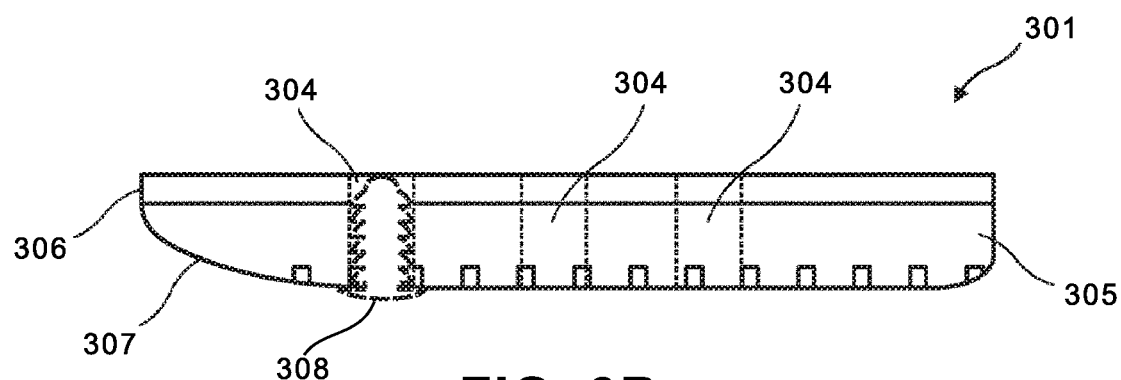
FIG. 3B is a side elevation view of an embodiment of an equine shoe having ports with a press-in 'christmas-tree' style plug.
Figure 3C:
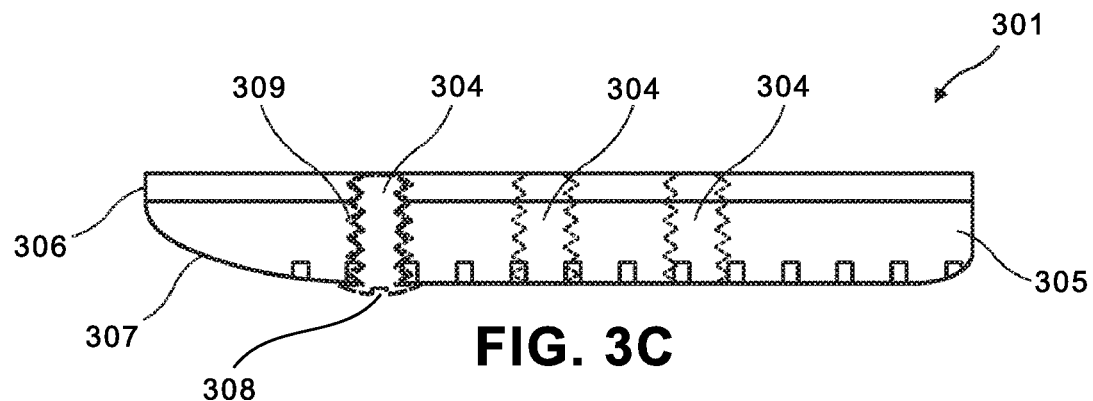
FIG. 3C is a side elevation view of an embodiment of an equine shoe having ports with a screw-in style plug.
Figure 4A:
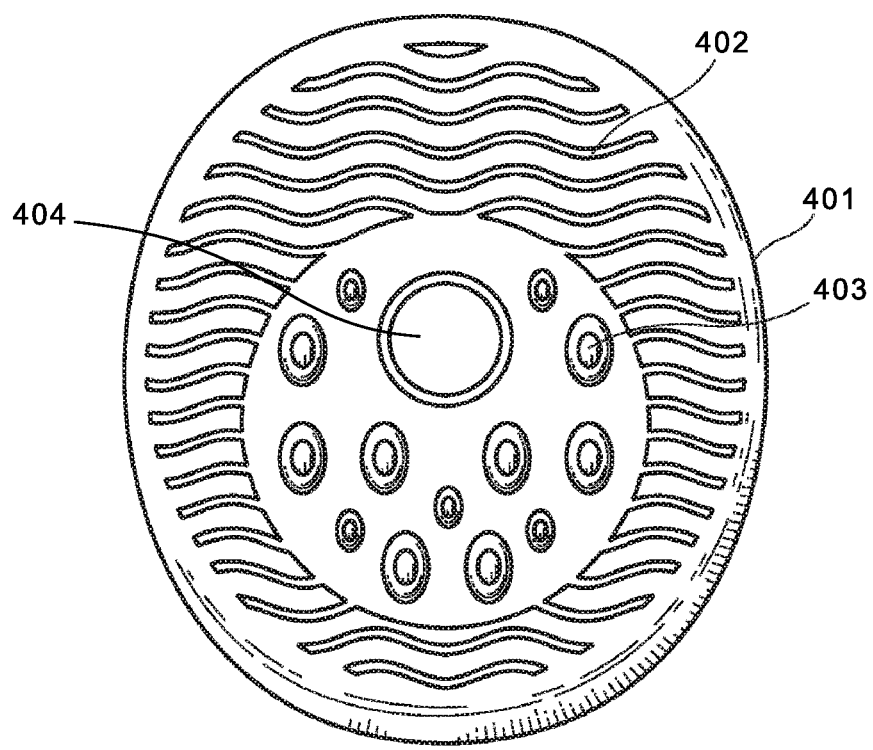
FIG. 4A is a bottom plan view of an embodiment of an equine shoe having a single port with a recessed area to receive a plug head.
Figure 4B:
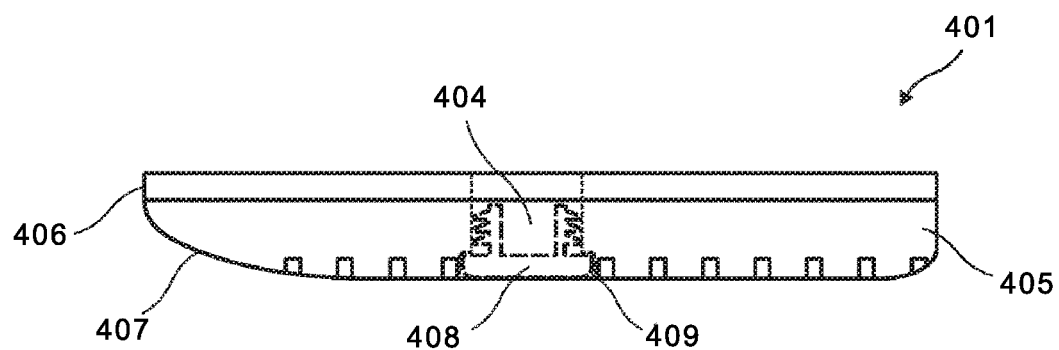
FIG. 4B is a side elevation view of an embodiment of an equine shoe having a single port with a recessed area to receive a plug head.

Referring to the figures, FIGS. 3A and 4A are bottom views of embodiments of a shoe structure, 301 and 401 of the invention. FIGS. 1E, 2E, 3B-3C, and 4B are side views of the shoe structure. FIGS. 3B, 3C, and 4B show the slope of the underside from the center (front to back) to front (307, 407), and rounded rear. At least one port (304, 404), an opening or hole, extends through the shoe structure so that void packing material (VPM) can be easily and conveniently inserted.

Medication or other advantageous material may be inserted or injected through one or more ports, on a routine schedule. The size and placement of the port(s) will depend upon the intended use. The opening may be any shape but are circular in a preferred embodiment. In general the port will be round and about one-sixteenth (1/16) to one and one-half (1.5) inch in diameter, being about one-half (1/2) inch in diameter in a preferred embodiment. In the shoe assembly, the ports are sealed by plugs (308, 408, 501) that pressure fit into the openings or have male threads (309) that screw into female threads in the side walls of the openings. The female threads preferably extend into the harder top section of the shoe to make the screw connection more secure.

Figure 5A:
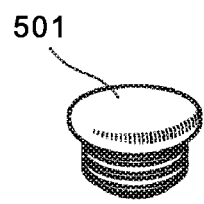
FIG. 5A is a perspective view of an embodiment of a plug.
Figure 5B:
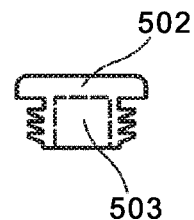
FIG. 5B is a side elevation view of an embodiment of a plug with a hollow area.

The plugs shown in FIGS. 5A and 5B are "fir tree" plugs that have flexible ridged sides that compress when inserted. Simple straight pressure fit plugs may also be used. It is also possible to permanently seal the openings, but removable plugs are used in a preferred embodiment. The plugs should not generally extend beyond the top surface of the shoe and are preferably made of polymer material of a hardness of no greater than that of the lower section of the shoe structure. Polyethylene, polypropylene, polyurethane elastomer, silicon rubber and the like are suitable material for the plugs. Acceptable plugs are available commercially from companies like ITW Fastex (www.itw-fastex.com), Apex Fasteners (apexfasteners.com) and StockCap (www.stockcap.com). The plugs will preferably have heads of at least slightly larger diameter than the principle diameter of the plug, and the opening(s) in the structure will be enlarged at one end (top or bottom of the shoe structure) so that the head of the plug can be recessed (See, for example, 409 of FIG. 4B).

As illustrated in FIGS. 3A-3C, some embodiments have three openings in the shoe structure. In some such embodiments, the placement is in a triangular pattern that will allow insertion or injection on either side of and in front of an equine hoof frog (when shoe is in place). There may be as many openings as desired but at least one to about four should be sufficient for most purposes. It is important to not compromise the integrity of the shoe structure. The total open space of the opening(s) relative to the surface of the shoe structure should not exceed about twenty (20) percent, and preferably not exceed about eleven and two-tenths (11.2) percent. A six (6) inch diameter shoe structure has a surface area of about twenty-eight and three-tenths (28.3) inches square. Four (4) openings (holes), of approximately one (1) inch diameter, have an open area of about $4 \times pi \times (radius)2 = 4 \times pi \times 0.52 \approx 4 \times 0.8 =$ three and one-tenth (3.1) square inches, or about eleven (11) percent of the shoe surface. The same diameter shoe structure with three (3) openings, approximately one and one-half (1.5) inches in diameter, has about $4 \times pi \times (1.5/2)2 \approx$ five and three-tenths (5.3) square inches opening area, or about eighteen and seven-tenths (18.7) percent of the surface. Significantly greater port area compromises the structural integrity of the shoe and is unsuitable. Conventional shoes have open space of more than about forty (40) percent, and usually as much as sixty-five (65) percent open space, and are of a generally arcuate shape, being open towards the heel.

FIG. 5A-5B illustrates embodiments with larger hollow plugs (plug 501 with cap 502 and hollow center 503). These are especially useful when it is important to observe a larger area of the hoof sole (or frog) or for insertion of larger medical components such as medication soaked gauze, foams, absorbent pads, custom orthotics, support structure material, void packing material, and the like. For example, when the larger opening 404 (and plug 501) is positioned under the frog of the hoof, it is possible to remove the plug and observe the condition of the frog. These plugs can be shorter than the opening, or the same length, but in any case provide a cavity 503 that provides additional space below the hoof for treatment. It is preferred that the opening be enlarged at the bottom to allow the head of the plugs to be receded (409). These are also especially useful in maggot treatment since the maggots can be placed in the plug's hollow cavity and additional smaller opening can be used for drainage. In an alternative embodiment, an additional, smaller hole is provided in the plug for drainage.

In a preferred embodiment regarding port placement, such as illustrated in FIGS. 4A-4B, a single port (404) is provided in approximately the center of the shoe. When a shoe is attached to an equine hoof in some such embodiments, there is an air gap between the sole (underside) of the hoof and the top of the shoe. Void packing material (VPM) is introduced through the port to fill at least some of the air gap, as discussed below.

In some embodiments, one or more ports are field-installed, such as with a drill bit. Some such ports are installed with a Forstner bit, leaving larger diameter recessed area (when looking from the bottom of the shoe) for a plug head, and a smaller diameter channel through all strata of the shoe, such as is illustrated in FIG. 4B.

Custom Orthotics

As used herein, void packing material (VPM) refers to any material used to fill a void underneath an equine hoof. In some embodiments, the primary purpose of VPM is to exclude contaminants from between the shoe and hoof, such as dirt, mud, sand, etc. In some embodiments, such as are described elsewhere herein, the primary purpose of VPM is for advantageous use with therapeutic compounds. In some embodiments, VPM is chosen and deployed to act as support structure material (SSM), and particularly serves at least the purpose of providing support to some portion of the hoof, shoe, or both.

In applying the shoe the user may use a suitable "pour-in" "custom orthotic pad" such as Vettec Equi-Pak™ or other commercial packing, pads, or both, that will be introduced through the opening (or at least one of the openings in embodiments with multiple openings) between the top surface of the shoe and the underside of the hoof.

In a preferred embodiment with a single port, such as is discussed above, VPM is introduced into the air gap between the hoof and the top of the shoe, thereby created a completely custom orthotic pad custom fitted for that hoof at that time. In some embodiments, one or more dividers are placed in the air gap before introducing the VPM, to subdivide the air gap into discrete sections that can be filled with different VPMs, or with none at all.

Such embodiments are particularly useful, for example, in cases of acute laminitis, where some cases in which the fore section of the sole needs to bear as little pressure as possible in order to avoid further inflaming and insulting the injured area. In an embodiment for such cases, a shoe is provided with at least one port, and a divider is provided to section off the toe area. VPM is introduced through the port and to the rear of the divider, creating a custom orthotic supporting the sole of the hoof, while leaving an air gap in the toe area, thereby shifting as much pressure as possible away from the injured area. In some embodiments, spacers are employed to increase the height of the air gap. In further embodiments, the divider runs front to back, or in one or more other desired directions. In so doing, areas can be advantageously created for different densities of VPM material (or no material), or for areas of different or no treatment. Treatment of laminitic cases, as well as damaged coffin bones, etc., can be advantageously accomplished, such as where a caudal, toe, or some other region is desired to be isolated, treated, supported, etc. in a different or custom manner.

Furthermore, custom orthotics provide a distinct advantage in preventing rotation of the orthotic pad during use and custom fitment. A custom orthotic pad simulates some of the same advantages as loose sand or other earth, in that it distributes the force on the hoof across the whole underside of the hoof, thereby preventing or ameliorating injury to the hoof wall, lamina, etc. It also enhances the effect of pumping of the frog as the hoof is loaded and unloaded, thereby increasing circulation in the hoof and leg.

In some embodiments, VPM is introduced or created as described herein in relation to a custom orthotic pad, but is not intended as a custom orthotic pad—i.e. not as SSM—but primarily for therapeutic purposes, sanitary purposes, other such purposed, or some combination thereof.

Dividers

In some embodiments, the divider is a continuous piece of soft polymer material, such as a soft rubber foam, approximately as high as the air gap between the shoe and hoof, and cut to length to span from one edge of the top surface of the shoe to the other side. The divider in particular embodiments is a triangular piece of rubber foam type material, and is adhesed to the surface of the shoe, prior to attaching the shoe to the hoof, by a strip of adhesive, which may be pre-applied to the divider, may be pre-applied to the shoe, may be adhesive tape, or may be a liquid or gel-like adhesive that is applied to the shoe or divider prior to assembling the divider onto the shoe. In some embodiments, the divider is attached by screws, tacks, rivets, bolts, etc; by hook-and-loop tape or similar attachment structures; by a mating groove and tongue between the divider and shoe; or similar methods. In some embodiments, the divider is a pre-made structure which is attached onto the shoe or hoof, or which is trimmed or otherwise adapted to fit the particular hoof. In some embodiments, the divider is placed onto the hoof before the shoe is attached, or is made from a polymer material with slightly tacky properties—similar in concept to gecko feet, and which some soft polymers possess—so that the divider 'sticks' to the hoof or shoe sufficiently to stay in place long enough for the shoe to be attached to the hoof.

In some embodiments, a single port is provided at approximately the widest portion of the shoe (when viewed from the top of the shoe), and the divider is placed so that it runs across the port, but does not completely occlude the port, thereby effectively creating a split port in which VPM (or other materials) can be introduced into one section of the air gap or the other from the same port. In some embodiments, the divider(s) is configured to create more than two sections in the air gap. In some embodiments, multiple ports are provided in order to access various sections of the air gap.

Material

VPM comprise a number of different materials in various embodiments. In various embodiments, VPM is provided which is particularly suitable for excluding any combination of dirt, sand, mud, snow, moisture, and other contaminants.

Suitable material for VPM depends on the purpose and application and includes, but is not limited to, dental impression materials, foams, elastomers, absorbent pads, absorbent materials, gauzes, cotton paddings, other such materials, and combinations thereof.

In some embodiments, VPM is a dental impression material. In some embodiments, VPM is a conventional hoof packing material, well known to those skilled in equine hoof care and healing. In some embodiments, VPM is a foam packing. In some such embodiments, the foam packing is a micro-cell foam of density between six (6) and thirty-six (36) pounds per cubic foot. Such a VPM is particularly suitable for excluding dirt, sand, mud, and other contaminants, while not exerting significant pressure on the equine hoof. If introduced in proper proportions between the hoof and shoe before curing, the foam will expand and conform to fill the desired void. The density of the foam, in some embodiments, is selected at least partially based on the measure of support or pressure to apply to the hoof, with higher density foam providing some measure of support, while lower density foam provides minimal to no support. Additionally, the foam is lightweight, thereby minimizing the impact of the additional material on the equine's comfort, gait, and health. In particular, a lower-density foam, such as a six pound per cubic foot foam, has insignificant weight, while still protecting the hoof and, potentially, providing therapeutic effect when provided with desired therapeutic compounds.

In some embodiments, VPM is chosen at least partially for therapeutic delivery properties. Foams acting in some measure as a sponge, can hold medicinal and other compounds, and keep them constantly in contact with the underside of the hoof. In various embodiments, therapeutic compounds are incorporated into VPM; VPM is provided with pores, channels, or other structures suitable, for example, for passage of therapeutic compounds or retainment of therapeutic compounds; or both. In some embodiments, the VPM is impregnated with, or otherwise provided with, medications, pharmaceuticals, or other beneficial compounds such as copper sulfate or other aqueous based medications, for treatment of the hoof. In some embodiments, the VPM is an open cell foam, absorbent material, or other material that allows at least some medications to soak in, thereby holding a medication or other treatment against the underside of the equine hoof.

SSM to create a completely custom orthotic pad is, in some embodiments, a soft, polymeric, shock-absorbing material, with sufficient elasticity to maintain support of the hoof for a reasonable amount of time. Many shoes are replaced every three (3) to six (6) weeks. The material is selected to be sufficiently elastic and durable to last for the expected amount of time before re-shoeing, or at least for the expected amount of time before the shoe is removed and inspected. In equines being treated regularly for hoof problems, the interval may be significantly shorter.

In a preferred embodiment, SSM is a polymer gel, that forms a solid when cured such that it retains the gel-like consistency required for hoof support and comfort, but does not shear infinitely without failure. In some preferred embodiments, the gel is a multi-part polyurethane casting elastomer that cures into a gel with 'hardness' of Shore 00 approximately ten (10) to fifteen (15). In some embodiments, an elastomer is used that is within the Shore 00 range from zero (0) to one hundred (100). In some embodiments, an elastomer is used of Shore A approximately zero (0) to seventy (70), with a preferred range being Shore A about eight (8) to fifty (50). One material suitable for some embodiments is GTS-10 to GTS-40, a urethane casting elastomer available from Win-Tech Products Corp., P.O. Box 1114, Tomball, Tex., 77377. In other embodiments, the pad comprises similar or identical material, but is configured as a VPM, and not particularly as SSM.

In a preferred embodiment, such as discussed in relation to dividers, the shoe has a single port at approximately the widest portion of the shoe, and a divider placed to divide the shoe and the port into two discrete sections. VPM of one density is introduced into one section, and VPM of a different density is introduced into the other section, thereby effectively creating a dual-density orthotic pad. Such a pad may effectively provide differential cushioning for treatment of injured hoofs, or for performance or other reasons. In some cases, as discussed herein, one section may be left empty to reduce pressure on a section of the hoof. In some embodiments, a similar structure and process is used to provide more than two sections.

In some embodiments, multiple different VPM of differing densities may be subsequently disposed in the same section to create a 'Neopolitan ice cream' effect of gradating densities to provide, for example, soft cushioning against a portion of the underside of the hoof, while providing firmer support underneath. In some such embodiments, an area, such as for toe support or frog support, may be filled with one type of VPM, and then a larger area, communicating with the area just filled, is filled with another type of VPM, thereby creating a frog support or toe support integral to a larger orthotic pad or pad section.

In other embodiments, VPM is introduced through multiple ports, and in still further embodiments, VPM is introduced through at least one port, while leaving at least one other port available for introduction of medication, therapeutics, or other material.

Further embodiments comprising various combinations of elements of the embodiments related to custom orthotics discussed herein are contemplated, consistent with the disclosure of the invention herein, and will be obvious to those skilled in the art of equine hoof shoeing and therapy.

Additional Variations

Variations from the description above are provided in some embodiments, while retaining the nature of the invention. For example, in some embodiments, one or more divots, or depressions, are provided in the top of the shoe to provide a greater depth of air gap, greater depth of VPM, etc. Such divots are provided, in some embodiments, by an abrasive wheel, such as is used with a hand-held angle grinder. One such abrasive wheel, used in a suitable prototype is a four and one-half (4.5) inch, forty (40) grit, grinding and polishing flap disc with a Steel Demon corner-edge grinding design, item number DCC045040N01F, available from distributors of Diablo abrasive products (www.diablotools.com).

Inserts

Embedded Inserts

Figure 7:
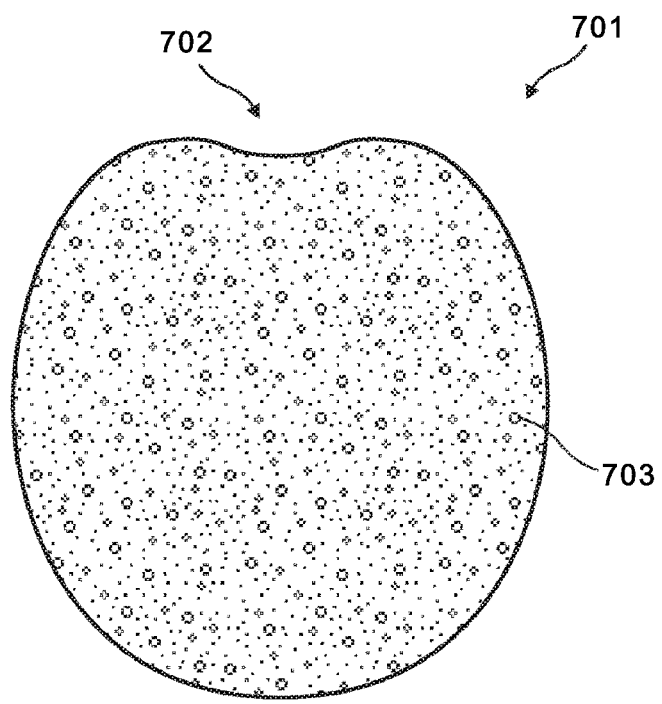
FIG. 7 is a top plan view of an embodiment of an equine shoe having particles embedded therein.
Figure 8:
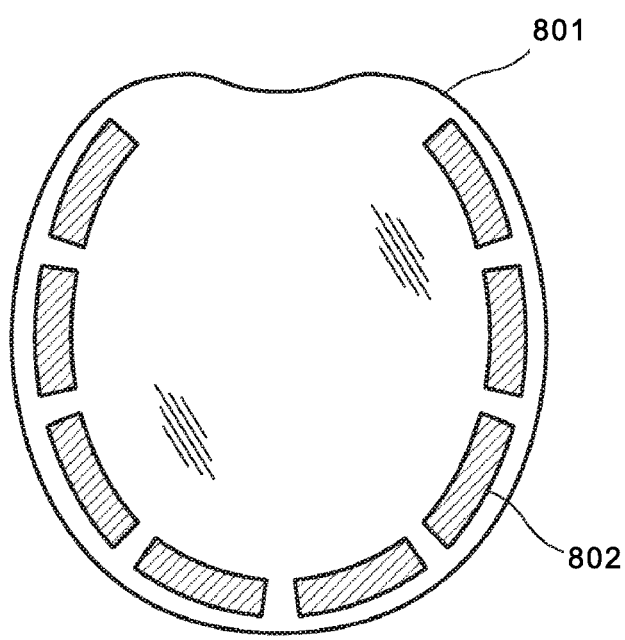
FIG. 8 is a top plan view of an embodiment of an equine shoe having bands embedded therein.

In some embodiments the top surface of the shoe will have a solid, preferably metals, incorporated where such substances are deemed beneficial for healing of equine hooves. Copper, silver, and magnetic metals are generally believed to be beneficial. Particles of copper, silver or magnetic particles are easily incorporated into the top hard surface of the shoe (e.g. particles 703 in shoe 701 with heel indent 702 in FIG. 7) in embodiments in which the shoe is made in an open mold. Appropriate amount of particles are poured into the top of the polymer in the mold before it is cured. When such particles are incorporated it is useful to grind or score the surface to expose the surface of the particles. In a prototype a shoe with copper particles was scored with a coarse grain belt sander. This exposes fresh surface of the metal for contact with the hoof underside. Particles of any suitable size and shape may be used, in general relatively flat particles of about one-sixteenth (1/16) to one-quarter (1/4) of an inch in diameter are suitable. Cut pieces of copper wire or spheres that have been flattened are suitable. Bands of metal are also be suitably used in some embodiments (for example, metal bands 802 in shoe 801 in FIG. 8). In some such embodiments, bands pre-molded to the shape of the shoe (but slightly smaller) are made and placed in the mold before the polymer cures to obtain a smooth continuous (or near continuous) layer of metal on the surface. On the use of silver and silver compounds, see, for example, *Uses of Silver as an Antibiotic in Horses* [13]. An alternate shoe shape having an indention in the back side is provided in some embodiments, which more closely approximates a hoof shape.

Port Inserts

In some embodiments UV (Ultra Violet) light LED (Light Emitting Diodes) are placed in one or more hollow plugs and a channel for wired electrical drilled or grooved from the opening to an outside edge of the shoe, preferably the back. The channel is preferably placed just below the hard top section of the shoe. UV light antibacterial effects are well known [14]. The intensity and duration can be determined by those skilled in the art. Generally about thirty (30) milli-Joules per square centimer is considered effective for destruction of most bacteria. In some embodiments, such a shoe is fitted on an equine and then the equine stalled and the LED light connected for sufficient time to provide antibacterial benefits.

Frog Support

In applying the shoe it is often desirable that hoof frog support be provided. This may be accomplished by uses of a number of currently available fillers known in the art. However, in one embodiment a suitable frog support is provided in this invention. The support is a triangular shape (as is the frog of an equine hoof) It can be molded into the shoe top surface as an integral part thereof or can be a separate piece that is attached as with a suitable adhesive. Polyurethane-casting elastomer having a Shore A hardness of from about eight (8) to about fifty (50) is suitable for the frog support, but very soft support may also be desirable in some cases and is contemplated herein, having a Shore 00 hardness of about five (5) to seventy (70).

Lite Orthotic

The lower section of the shoe, if made of polymer, may be reduced in weight by adding low density small particles (preferably spheroidal shaped) into the polymer as is done with polymer equine boot orthotics in U.S. patent application Ser. No. 15/634,080, filed Jun. 27, 2017, U.S. patent application Ser. No. 13/396,191, filed Feb. 14, 2012, and U.S. patent Ser. No. 14/046,430 filed Oct. 4, 2013, the disclosures of which are incorporated herein by reference.

The particles may be any material with sufficient flexibility and durability for incorporation into a shock absorbing orthotic pad. In a preferred embodiment wherein the polymer of the solid member is polyurethane, the particles materials are of lower density than elastomeric polyurethane, capable of being adhered to by elastomeric polymer materials (preferably polyurethane), and generally spherical or elliptical in shape. Suitable materials include, but are not limited to, polymers and elastomers, and preferably expanded foam or cellular formulation of these polymers. Specific examples include polypropylene (PP) and expanded polypropylene, polyethylene (PE) and expanded polyethylene, high density polyethylene (HDPE), ethylene propylene diene monomer (EPDM), polystyrene (PS), polyurethane (PU) and polyurethane foams, polystyrene (PS), polybutadiene, styrene-butadiene rubber (SBR), and polyvinyl chloride (PVC).

In one embodiment, PP and PE are preferred, with closed-cell expanded PP being particularly preferred for its low density, high durability, flexibility, resilience, and thermal insulation. The particle cross section or diameters are desirably in the range of one (1) to six (6) millimeters (mm) (3.9×10−2 to 2.4×10−1 inches).

In a preferred embodiment, the spheroids have a diameter of approximately two (2) to four (4) mm (7.9×10−2 to 1.6×10−1 inches), with approximately three (3) mm (7.9× 10-2 inches) being particularly preferred. Particles of these sizes are small enough to be incorporated into the elastomer and large enough to not unduly increase viscosity of the polymer mixture during molding. If the particles are too large the result is a kind of permanent set reducing the flexibility and compressibility of the molded piece.

One of the key properties of the particles is their low density compared to the polymer of the solid member, resulting in a lower overall weight-to-volume ratio of the member. The difference in density between the particles and the polymer causes the particles to rise towards the top of the mold during casting, which becomes the bottom of the member. Because the particles are lower density than the polymer, they rise and accumulate at the top of the mold, which is the bottom of the pad, during molding. The member will then consist of a top layer comprised predominately of elastomer(s) that will be in contact with the hoof and a bottom layer of particle-filled polymer that provides a thermal barrier to protect the bottom of the cast, on which the device is fitted, from overheating.

It is obvious that in other embodiments, the relative densities of the particles and elastomer(s) may be varied to control the relative positions of elastomer and particles. The density of the particles is desirably in the range of about twenty (20) to five hundred twenty (520) grams/liter (g/l). For example, expanded polypropylene beads have a density range of about ten to two hundred (10-200) g/l, and preferred mid density beads have a density range of from about forty to one hundred twenty (40-120) g/l. Suitable PU elastomers have densities of about one thousand twenty-five to one thousand seventy (1025-1070) g/l, so the ratio of density of elastomer to particle will be in the range of from about eight to twenty-eight (8-28). It is preferred that the particles be at least half the density of the elastomer and preferably no more than about thirty (30) percent as dense.

The solid structure, if made of polymer, may be reduced in weight by adding lower density small particles into the polymer as is illustrated with polymer equine boot orthotics in the applications referenced in the introduction to the "Lite Orthotics" section.

While the orthotic is generally softer than the shoe structure of this invention, the inclusion of lower density particles works in the same way. The particles may be any material with sufficient durability for incorporation into the shoe structure. The particles materials are of lower density than polymer of the shoe structure, must be capable of being adhered to by elastomeric polymer materials (preferably PU), and generally, but optionally, spherical or elliptical in shape.

Suitable materials may include, but are not limited to, polymers and elastomers, and preferably expanded foam or cellular formulation of these polymers. Specific examples include polypropylene (PP) and expanded PP, polyethylene (PE) and expanded PE, high density polyethylene (HDPE), ethylene propylene diene monomer (EPDM), polystyrene (PS), polyurethane (PU) and polyurethane foams, polystyrene (PS), polybutadiene, styrene-butadiene rubber (SBR), and polyvinylchloride (PVC). In one embodiment, PP and PE are preferred, with closed-cell expanded PP being particularly preferred for its low density, high durability, flexibility, resilience, and thermal insulation.

The particle cross section or diameters are desirably in the range of one (1) to six (6) millimeters (mm) ($3.9 \times 10^{-2}$ to $2.4 \times 10^{-1}$ inches). In a preferred embodiment, the particles have a diameter of approximately two (2) to four (4) mm ($7.9 \times 10^{-2}$ to $1.6 \times 10^{-1}$ inches), with approximately three (3) mm ($7.9 \times 10^{-2}$ inches) being particularly preferred. Particles of these sizes are small enough to be incorporated into the polymer of the structure and large enough to not unduly increase viscosity of the polymer mixture during molding. If the particles are too large the result is a kind of permanent set reducing the flexibility and compressibility of the molded piece.

One of the key properties of the particles is their low density compared to the polymer of the solid shoe structure, resulting in a lower overall weight-to-volume ratio of the structure. The difference in density between the particles and the polymer in the structure causes the particles to rise towards the top of an open mold during casting, which becomes the bottom of the member. The shoe will have a top harder section as described above that does have particles and will be poured on top of the softer section with particles in an open mold. The relative densities of the particles and polymer of the structure may be varied to control the relative positions of elastomer and particles. The particles also increase the thermal insulation quality of the shoe.

The density of the particles is desirably in the range of about twenty (20) to five hundred twenty (520) grams/liter (g/l). For example, expanded PP beads have a density range of about ten to two hundred (10-200) g/l, and preferred mid density beads have a density range of from about forty to one hundred twenty (40-120) g/l. Suitable PU for the structure have densities of about one thousand twenty-five to one thousand seventy (1025-1070) g/l, so the ratio of density of polymer in the structure to particle will be in the range of from about eight to twenty-eight (8-28). It is preferred that the particles be at least half the density of the lower polymer structure and preferably no more than about thirty (30) percent as dense.

In broad aspect, the method for manufacturing the lighter solid shoe structure comprises mixing particles with one or more elastomer component during curing to form a molded piece. The basic process is to mix the elastomer components and catalysts, and to disperse the particles in unset polymer during curing while the polymer is still substantially in the liquid state. A mold of the desired size and shape is filled with the resulting mixture and the mixture is allowed to set and cure.

In some embodiments the structure of the shoe lower section will have fiber incorporated into it. Fibers such as those used in reinforcing cement are suitable. For example, fibers such as PP, cellulose, and carbon are suitable. Ultra-HDPE (Dyneema™ and Spectra™) are especially suitable for strength and durability. The amount of fiber in the lower (soft) section of the shoe must be controlled to prevent the structure from becoming too hard and the amount of fiber will depend on a number of factors, particularly the composition of the material of the structure and the hardness desired. The proper amount can easily be determined by simple experiment. Powdered Teflon™ may also be added to the structure composition to increase its strength and durability. The Teflon added to the elastomeric urethane is very abrasive resistant and is especially applicable for hard aggregate race tracks like those used in standard bred harness racing.

Kit

In some embodiments the invention is a kit of components, as that is the way in which some embodiments will be merchandized. The kit comprises the shoe assembly as described in detail above (multi strata shoe structure with a convex dome underneath and with an access port(s) and plug(s) appropriately sized for the port(s)). The kit may also include any combination of suitable glue to attach the shoe structure, drill bits to drill initial or additions holes, instruction sheets, suitable orthotic pad material and placement apparatus (such as an epoxy mixing/dispensing gun, such as those used by farriers and equine veterinarians to apply multi-part adhesives or fillers to shoes and hooves).

In some embodiments, a kit will contain a shoe, or multiple shoes of different types, sizes, etc, and roll of stretch wrap and suitable glue, combined with instructions suggesting easy ways for the veterinarian or equine owner to test them on the hoof. In some embodiments, a kit will further contain VPM of appropriate types for various purposes such as laminitis, navicular disease, performance, senior equines, snow, moisture, sand, dirt, etc.

In some embodiments, a kit will contain sealed bags of components of multi-component VPM, for example an epoxy and hardener, or two-component foams, to be opened by a user and mixed before applying to the hoof. In some such embodiments, a kit will contain blister packs of components. In some embodiments, the kit contains a multi-component satchel containing the two components that is squeezed by a user to mix the components, before opening the satchel to dispense the resulting VPM. In some such embodiments, the kit also contains copper sulfate, or other therapeutic compounds to be applied to the hoof. In some cases, therapeutic compound is mixed with the VPM before application.

Hoof Treatment Uses of the Shoe Assembly

The opening(s) in the shoe allow access to the sole of the hoof so that therapeutic compounds—such as medications—may be applied without removing the shoe. With the shoe attached, filler material may be injected to provide complete support to the underside of the hoof. This is similar to the technique used with conventional shoes but with the added enclosure and better protection from dirt, mud and the like, and from damage of the filling material. Suitable filling includes Vettec Equi-Pak (Vettec Hoof Care—http://www.vettec.com) and similar products.

Medication for hoof diseases and ailments as for thrush may also be injected. Larger hollow plugs provide convenient means for maggot treatment (maggots can be placed in the hollow section of the plugs, and removed for cleaning). Drainage can be accomplished with small holes in the shoe or in the head of the hollow plugs.

Thrush is a bacterial infection that is fairly easily treated with a plethora of treatments, liquids, powders and salves. See Dr. Morrison's video on Identifying and Treating Thrush in Horses [15]. Any compound that will kill the bacteria such as dilute bleach or dilute chlorhexidine or povidone iodine bleach, iodine, silver compounds a such as silver nitrate etc. is effective. Drying agents such as copper naphthenate (Kopertox) or an isopropanel formalin, iodine complex, and gentian-violet combination (Thrush Buster) are also used in conjunction with the other bacteria killing agents (and are potential therapeutic compounds, as used elsewhere herein). See "Thrush Treatment Summary" for a listing of the various compounds and treatment protocols for thrush treatment [16]. For the purpose of this invention any of these compounds may be injected, replaced, and debris removed through the openings in the shoe without the damaging effects of removing and replacing the shoe. The plugs seal the opening to keep the medication in place and to keep the hoof clean and dry.

As used herein, "therapeutic compound" includes medication, nutraceuticals, topical treatments, ointments, salves, and other compounds, solutions, suspensions, etc. in forms including powders, liquids, gels, tablets, capsules, etc., which are applied for the purpose of improving the health or well-being of an animal. In some embodiments, as discussed herein, "therapeutic compound" may comprise active elements, such as medical maggots.

There is revival of interest in use of maggot debridement for a number of equine hoof conditions. Maggot debridement by certain species of maggots is specific for necrotic tissue and results partly from the maggot's proteolytic digestive enzymes liquefying the necrotic tissue and partly from the physical action of the mouth hooks on the tissue, which pierce and tear the necrotic tissue, allowing the digestive enzymes to reach the depths of the necrotic tissue. "In horses, maggot debridement therapy is described as an alternative approach to the management of septic navicular bursitis, hoof infections and necrosis in cases of complicated laminitis" [17], as well as in PIII osteomyelitis and other hoof disease [18]. Dr. Robert Agne, DVM, of Rood and Riddle Equine Hospital; Lexington, Ky. describes the procedure for hoof bio-surgery as follows: " . . . we must ensure that if the maggots are placed in the bottom of the foot they are not compressed too tightly when the horse is weight bearing. Occasionally, the defect in the sole of the hoof is large enough that we can place the maggots, along with the dressing in the wound and apply a heavy foot wrap. Otherwise a shoe is applied that has a plate that offers wound protection and can be removed in order to change the gauze and monitor the progress of the maggots." [19]

The shoe assembly works well for maggot therapy by allowing access to the hoof through the, properly placed port(s) with hollow larger plug(s). If desired there can be a spacer applied between the shoe and hoof to provide additional space. Other treatment and medication protocols will be apparent to those skilled in the art.

Method for Treatment of Equine Laminitis

Laminitis is a costly disease for equine owners. Many better known and famous racehorses have had to be euthanized because of laminitis, and there is a continuing search for causes and cures. Chronic laminitis most commonly involves the distal displacement (rearward movement/rotation and sometimes sinking) due primarily to trauma, insult or swelling of the lamina (attachment tissue) of the P3 (coffin bone or distal phalanx) to the hoof wall. The deep digital flexor tendon, (doing its job), continues to keep tension on the bony column and further pulls the P3 out of the ideal position within the hoof capsule, resulting in an alignment shift of the weight-bearing functionality of the P3 from its solar surface (bottom of bone should be parallel to the ground surface). This realignment, results in chronic pain and over time decreased sole growth (contracted heels etc.). Many realignment techniques of the P3 cannot be achieved during the initial developmental stages of laminitis because the hoof capsule is unstable and continually changing. Many traditional mechanical realignment procedures like therapeutic trimming or special shoes have been very problematic, painful and traumatic to the horse; are expensive and do not achieve the successful outcomes the horse owners desire.

If laminitis is suspected it may be confirmed by radiograph of the hoof. If confirmed the equine hoof will respond to, and often laminitis can be prevented by, icing of the affected hooves as described in U.S. Pat. No. 9,055,732, issued Jun. 16, 20016, the disclosure of which is incorporated herein by reference. After icing, or if icing is not possible or practical under the circumstances, the hoof or hooves will be stabilized by use of an equine boot with an adjustable heel lift wedge (See U.S. patent application Ser. No. 15/082,749 filed Mar. 28, 2016, the disclosure of which is incorporated herein by reference). The fit in the boot and desirable angle (comfortable angle for the equine) can be adjusted by reference to radiographs until the hoof or hooves are suitably stabilized. When stabilized, the hoof or hooves are fitted with a solid shoe as described in U.S. patent application Ser. No. 15/138,002, filed Apr. 25, 2016 and in U.S. patent application Ser. No. 15/051,343 filed Feb. 23, 2016, the disclosures of which are incorporated herein by reference or, preferably, a shoe as described herein.

Radiographs

Radiographs have become a common and essential tool in diagnosing hoof ailments. Examples of radiograph use and improvements include, inter alia, U.S. examples include U.S. Pat. Nos. 8,413,731, 7,716,843, 7,088,847, and U.S. application Ser. No. 2013/0129056. It is well established that early treatment of laminitis is critical. Researchers and practitioners agree that frog support is needed and that relief of the tension on the coffin bone by the deep digital flexor tendon (DDFT) is essential, thus, lifting the heel of the hoof to increase the angle of the diseased hoof is important. Regarding hoof treatment of laminitic equine, it has been said: "Many farriers feel that supporting the frog is of immediate concern as soon as symptoms are noticed. Support can be given by padding up around the frog with gauze bandages or a commercially available "lily pad"™ which can be fitted whilst a horse is still wearing shoes. Immediate pain relief can be offered by using a wedge to raise the heel, thus relieving pressure from the toe area. Raising the heel reduces the pull on the rear of the pedal bone and may help to minimize further lamellar tearing" [20].

Heel Lift Wedge Boot

The wedge heel lift boot of U.S. application Ser. No. 15/082,749, filed Mar. 28, 2016, and incorporated herein by reference, provides an efficient, lift adjusting approach to sole supportive realignment of the P3 as the hoof grows out. This equine boot system and assembly provides a heel lifting adjustable wedge to lift the heel section of an equine hoof to relieve and reduce the consequences of laminitis and optionally to provide frog support. Lifting the heel is useful in reducing the tension on the DDFT. In some embodiments of this invention, such a heel lift system is adapted to use in a shoe assembly such as those disclosed herein.

CONCLUSION

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept. The specification and drawings are, accordingly, to be regarded in an illustrative rather than a restrictive sense. Therefore, the scope of the invention should be limited only by the appended claims.

REFERENCES

[1] H. Castelijns, "Shock absorbing shoeing techniques," *Mascalcia.net*, 28 Oct. 2000. [Online]. Available: http://www.mascalcia.net/articoli/a2000_27.htm. [Accessed: 18 Jan. 2019].

[2] H. Castelijns, "Shoeing Laminitis Cases," *Mascalcia.net*, 2004. [Online]. Available: http://www.mascalcia.net/articoli/a2004_73.htm. [Accessed: 18 Jan. 2019].

[3] H. Castelijns, "Hoof care for laminitis and founder," *Mascalcia.net*, March 2003. [Online]. Available: http://www.mascalcia.net/articoli/a2003_55.htm. [Accessed: 18 Jan. 2019].

[4] Castelijns, "Orthopedic shoeing techniques in the prevention and treatment of tendon and articular pathologies," *Mascalcia.net*, December 1999. [Online]. Available: http://www.mascalcia.net/articoli/a1999_15.htm. [Accessed: 18 Jan. 2019].

[5] H. Castelijns, "Full rolling motion shoes in equine podiatry," *Mascalcia.net*, 2003. [Online]. Available: http://www.mascalcia.net/articoli/a2003_56.htm. [Accessed: 18 Jan. 2019].

[6] M. L. Steward, "How to Construct and Apply Atraumatic Therapeutic Shoes to Treat Acute of Chronic Laminitis in the Horse," in *AAEP Proceedings*, New Orleans (LA), vol. 49, pp. 337-346.

[7] Equicast.com, "Dr Mike Steward's Wooden Shoes," *Equicast*. [Online]. Available: haps://equicast.com/therapeutic-shoes/dr-mike-stewards-wooden-shoes/. [Accessed: 18 Jan. 2019].

[8] F. Jurga, "Clog on Clog: Removable System for Laminitis," *The Hoof Blog*, 23 Jul. 2008.

[9] Miner Elastomer Products Corporation, "Shore A to Shore D Comparison," *Miner Elastomer Products Corporation*, 2016. [Online]. Available: https://www.minerelastomer.com/technical-data/tecspak-features/shore-shore-d-comparison/. [Accessed: 5 Dec. 2018].

[10] A. Pavia, "Why Equine Bones Break And Tendons Rupture," *Am. Farriers J.*, vol. 2016, no. May/June, pp. 48-54, May 2016.

[11] H. Clayton, "Mechanics of Equine Locomotion."

[12] M. C. V. van Heel, P. R. van Weeren, and W. Back, "Shoeing sound Warmblood horses with a rolled toe optimises hoof-unrollment and lowers peak loading during breakover," *Equine Vet. J.*, vol. 38, no. 3, pp. 258-262, May 2006.

[13] Kentucky Equine Research Staff, "Uses of Silver as an Antibiotic in Horses," *EquiNews Nutrition and Health Daily*, 22 Sep. 2011. [Online]. Available: haps://ker.com/equinews/uses-silver-antibiotic-horses/. [Accessed: 06-Dec-2018].

[14] "Ultraviolet germicidal irradiation," *Wikipedia*. 5 Nov. 2018.

[15] The Horse, *Identifying and Treating Thrush in Horses*.

[16] L. Cowles, "Thrush Treatment & Abscess Soak Summary," HealthyHoof.com, 2011. [Online]. Available: http://healthyhoof.com/articles/Thrush/ThrushSolutions.php. [Accessed: 6 Dec. 2018].

[17] S. Morrison, "How to use sterile maggot therapy," in *Proceedings 51st Congress of AAEP*, Seattle, 2005.

[18] F. Jurga and S. Morrison, "Maggot debridement therapy," *Hoof Care Lameness*, vol. 78, pp. 28-31, 2004.

[19] R. Agne, "Equine MDT Dressings," *Monarch Labs*, 2006. [Online]. Available: https://www.monarchlabs.com/equinedressings.htm. [Accessed: 30 Jan. 2019].

[20] Kentucky Equine Research Staff, "Explaining Laminitis Part Three: Diagnosis, Current Advice on Treating Laminitis and Prevention," *Cyberhorse Guide to Horse Health*. [Online]. Available: http://www.cyberhorse.net.au/cgi-bin/tve/displaynewsitem.pl?200403251aminitispt3.txt. [Accessed: 6 Dec. 2018].

I claim:

1. An equine shoe assembly comprising:
   (i) a solid member that covers substantially the entire underside of a hoof, wherein the solid member has at least two strata, and wherein: (1) the at least two strata comprise an uppermost stratum of material of at least Shore A ninety (90) and a lowermost stratum of Shore A hardness of about forty-five to sixty-five (45-65), (2) the bottom surface of the solid member comprises a convex surface, and (3) the convex surface and uppermost stratum are configured such that a hoof stepping down on the uppermost stratum causes at least a center portion of the uppermost stratum to flex upwards toward an underside of the equine hoof; and
   (ii) a custom insert, disposed in a region comprising at least some portion of a volume of space between the top surface of the solid structure and an underside of the hoof, the custom insert comprising a material which fills and conform to the shape of the region.

2. The equine shoe assembly of 1, wherein the custom insert is comprised of void filler material, and is configured at least to minimize the amount of contaminants reaching at least some portion of the underside of the hoof.

3. The equine shoe assembly of 2, wherein the void filler material is a foam.

4. The equine shoe assembly of 3, wherein the foam is a multi-component, micro-cell, polymer foam of density between six (6) and thirty-six (36) pounds per cubic foot, and wherein the foam is assembled with the shoe and applied to the hoof before the foam is cured.

5. The equine shoe assembly of 1, wherein the custom insert is a custom orthotic insert comprised of support structure material, and is configured to distribute the resistive force across at least some portion of the underneath of the hoof.

6. The equine shoe assembly of 1, wherein the custom insert is introduced through at least one port, said port extending through all strata of the solid member.

7. The equine shoe assembly of 6, further comprising at least one plug that fits into and seals the port.

8. The equine shoe assembly of 6, wherein:
(i) at least one polymer divider is provided of height approximately equivalent to a largest distance between the bottom of the hoof and the top of the shoe and normal to the top surface of the shoe;
(ii) the divider is secured to the top surface of the solid structure prior to attachment of the shoe to the hoof; and
(iii) the divider is placed to section the port into at least two effective ports;
thereby creating:
(a) at least two distinct air gaps between the top of the shoe and the bottom of the hoof, and
(b) an at least bi-sected port which provides access to both air gaps;
wherein at least one air gap is provided with void filler material, introduced through the at least bi-sected port, to create a custom insert.

9. The equine shoe assembly of 1, wherein:
(i) at least one polymer divider is provided of height approximately equivalent to a largest distance between the bottom of the hoof and the top of the shoe, and normal to the top surface of the shoe, and
(ii) the divider is secured to the top surface of the solid structure prior to attachment of the shoe to the hoof;
thereby creating at least two distinct air gaps between the top of the shoe and the bottom of the hoof;
wherein at least one air gap is provided with void filler material to create the custom insert.

10. A shoe for an equine comprising a solid member that covers substantially the entire underside of a hoof, wherein the solid member has at least two strata, and wherein:
(a) the at least two strata comprise an uppermost stratum of material of at least Shore A ninety (90) and a lowermost stratum of Shore A hardness of about forty-five to sixty-five (45-65);
(b) the bottom surface of the solid member comprises a convex surface;
(c) the convex surface and uppermost stratum are configured such that an equine hoof stepping down on the uppermost stratum causes at least a generally center portion of the uppermost stratum to flex upwards toward an underside of the equine hoof.

11. The shoe of 10 wherein:
(i) the convex surface comprises a landing area which is, when viewed from underneath the shoe, bounded on a left and right side by two compound curves, a left curve and a right curve, running generally from the heel to the toe;
(ii) the compound curves, in relation to a centerline running from the heel to the toe of the shoe, each comprise: (a) a concave curve, curving towards the centerline, nearer the toe and, (b) a convex curve, curving away from the centerline, nearer the heel;
(iii) the landing area so bounded is gently convex from left to right, allowing the shoe to rock side to side no more than five (5) degrees from horizontal when the shoe is substantially horizontal to a ground plane;
(iv) a center of the concave curve of the right curve and left curve is located approximately at sixty (60) degrees and three hundred (300) degrees from the centerline, respectively, measuring clockwise starting at the toe;
(v) the convex surface is three-eighths (⅜) to three-quarters (¾) of an inch thick; and
(vi) a minimum width between the compound curves occurs further towards the toe than a maximum width between them, the minimum width being sixty (60) to seventy (70) percent shorter than the maximum width.

12. The shoe of 10 wherein:
(i) the convex surface comprises a convex curve when viewed from a side of the shoe, curved out away from the top surface of the shoe, running from the toe to the heel of the shoe;
(ii) the convex surface is three-eighths (⅜) to one (1) inch thick at a maximum thickness, the maximum thickness occurring at least at a peak line running from side to side across the shoe, the peak line positioned back from the toe of the shoe between forty (40) to sixty (60) percent of a total length of the shoe;
(iii) the slope of the convex curve, accelerating towards the top surface of the shoe in both directions at increasing distance from the peak line towards the toe and heel of the shoe;
(iv) the convex surface comprises a fore landing area bounded towards the heel by the peak line and towards the toe by a line running from side to side across the shoe and positioned back from the toe of the shoe between twelve (12) and twenty-five (25) percent of the total length of the shoe;
(v) the convex surface comprises a rear landing area bounded: (a) towards the toe by a line running from side to side and positioned forward from the heel of the shoe between fifty (50) to seventy (70) percent of the total length of the shoe, and (b) towards the heel by a line running from side to side across the shoe and positioned forward from the heel of the shoe between five (5) and twenty-five (25) percent of the total length of the shoe;
(vi) rearward of the rear landing area, the convex surface curves upward towards the top surface of the shoe;
(vii) the convex surface comprises a rocker toe area forward of the fore landing area, the convex curve configured such that the shoe can roll forward while maintaining contact of the convex surface with a relatively flat ground surface such that the top surface is at angle of at least twenty (20) degrees relative to the ground surface before the uppermost stratum touches the ground surface; and
(viii) left and right sides of the fore landing area, the rear landing area, and the rocker toe area are radiused.

13. The shoe of 10 wherein:
(i) the convex surface comprises a first convex curve when viewed from a side of the shoe, curved out away from the top surface of the shoe, and running from the toe to the heel of the shoe;
(ii) the convex surface comprises a second convex curve when viewed end-on from the toe or heel of the shoe, curved out away from the top surface of the shoe, and running from side to side across the shoe;

(iii) the convex surface is one-eighth (⅛) to one-half (½) inch thick at a maximum thickness, the maximum thickness occurring at least along a peak line running from side to side across the shoe, the peak line positioned forward from the heel of the shoe between twenty-five (25) to fifty (50) percent of a total length of the shoe;

(iv) rearward of the rear landing area, the convex surface curves upward towards the top surface of the shoe; and (v) the convex surface comprises a rocker toe area forward of the peak line area, the first convex curve configured such that the shoe can roll forward while maintaining contact of the convex surface with a relatively flat ground surface such that the top surface is at an angle of at least ten (10) degrees relative to the ground surface before the uppermost stratum touches the ground surface.

14. The shoe of 13 further wherein:

(vii) a plurality of bosses extend outward from the convex surface of the shoe, in directions approximately normal to the convex surface at a location of a particular boss;

(viii) the bosses are of a height between one-eighth (⅛) to one-quarter (¼) of an inch;

(xi) the height of the bosses permits the shoe to pivot forward on the foremost bosses, past the rocker toe area, at an angle of at least fifteen (15) degrees relative to the ground surface before the uppermost strata touches the ground surface; and (x) the height of the bosses allows the shoe to pivot side-to-side on the outermost bosses, at an angle of at least fifteen (15) degrees relative to the ground surface before the uppermost strata touches the ground surface.

15. The shoe of 10 wherein the uppermost strata extends leftward and rightward past the convex surface, creating a lip.

16. The shoe of 10, wherein a bottom surface of the solid member is patterned.

17. The shoe of 16 wherein the pattern comprises generally wave-shaped grooves oriented generally side-to-side across the convex surface of the shoe.

18. The shoe of 16 wherein the pattern comprises both (a) grooves oriented generally side-to-side across the convex surface of the shoe, and (b) elliptical bosses configured such that the tops of the bosses form a part of the convex surface.

19. The equine shoe of 10, further comprising a foam insert between the shoe and the hoof, wherein:

(i) the foam insert is made from a plurality of components;

(ii) the components are provided in containers of predetermined quantity;

(iii) the components are not all mixed together until the foam is needed, at which time at least two of the components are mixed together to result in an uncured foam mixture; and (iv) the uncured foam mixture cures, resulting in the foam insert, while constrained at least by the hoof and the shoe.

20. A method of therapy of an equine hoof comprising:

(1) after an insult to the hoof, providing an equine boot and elastomeric orthotic pad, wherein:

(i) the boot comprises: (a) an upper section made from flexible material, shaped to fit around the hoof and of a height to reach above the hoof, having fastening means to fasten a front and a rear of the upper section together around a leg of an equine, and (b) a bottom section, comprising an elastomer sole plate attached to the upper section and having a wall around a circumference of the sole plate, (ii) the elastomeric orthotic pad is disposed in the bottom of the boot, and (iii) the wall of the sole plate is of sufficient height and strength to constrain deformation of the elastomeric orthotic pad placed therein, and which is compressed by the weight of a horse's hoof;

(2) once the acute or serious injury is abated, replacing the equine boot with an equine shoe;

wherein:

the equine shoe comprises a solid member that covers substantially the entire underside of a hoof, wherein the solid member has at least two strata, and wherein:

(i) the at least two strata comprise an uppermost stratum of material of at least Shore A ninety (90) and a lowermost stratum of Shore A hardness of about forty-five to sixty-five (45-65);

(ii) the bottom surface of the solid member comprises a convex surface;

(iii) the convex surface and uppermost stratum are configured such that an equine hoof stepping down on the uppermost stratum causes at least a center portion of the uppermost stratum to flex upwards toward an underside of the equine hoof.

21. The method of 20 wherein at least one port is provided in the equine shoe which extends through all strata of the solid member, and a removable and replaceable plug is provided for the at least one port, and wherein the method further comprises:

(3) providing therapeutic compound to the equine hoof while wearing the shoe.

\* \* \* \* \*